(12) United States Patent
LaPointe et al.

(10) Patent No.: US 11,622,629 B2
(45) Date of Patent: Apr. 11, 2023

(54) WALL-PROXIMITY FURNITURE MEMBER HAVING SYNC MECHANISM

(71) Applicant: La-Z-Boy Incorporated, Monroe, MI (US)

(72) Inventors: Larry P. LaPointe, Temperance, MI (US); Jaime A. McPherson, Signal Mountain, TN (US); Christopher A. Larsen, Georgetown, TN (US); Randy Loper, Rose Hill, MS (US); Richard D. Hartford, Maybee, MI (US); Chandrasekar Ramasubramanian, Dayton, TN (US)

(73) Assignee: La-Z-Boy Incorporated, Monroe, MI (US)

( * ) Notice: Subject to any disclaimer, the term of this patent is extended or adjusted under 35 U.S.C. 154(b) by 0 days.

(21) Appl. No.: 17/643,928

(22) Filed: Dec. 13, 2021

(65) Prior Publication Data

US 2022/0125201 A1 Apr. 28, 2022

Related U.S. Application Data

(63) Continuation of application No. 17/034,789, filed on Sep. 28, 2020, now Pat. No. 11,197,549.

(51) Int. Cl.
*A47C 1/031* (2006.01)
*A47C 1/022* (2006.01)
(Continued)

(52) U.S. Cl.
CPC .......... *A47C 1/0345* (2013.01); *F16H 21/28* (2013.01); *F16H 53/025* (2013.01)

(58) Field of Classification Search
CPC .... A47C 1/0355; A47C 1/0352; A47C 1/0345
See application file for complete search history.

(56) References Cited

U.S. PATENT DOCUMENTS

| 203,602 A | 5/1878 | Dietsch |
|---|---|---|
| 1,182,854 A | 5/1916 | Poler |

(Continued)

FOREIGN PATENT DOCUMENTS

| CA | 1316807 C | 4/1993 |
|---|---|---|
| CN | 87203587 U | 1/1988 |

(Continued)

OTHER PUBLICATIONS

International Search Report and Written Opinion of the International Searching Authority for Application No. PCT/US2021/052135 dated Jan. 3, 2022.

(Continued)

*Primary Examiner* — Shin H Kim
(74) *Attorney, Agent, or Firm* — Harness, Dickey & Pierce, P.L.C.

(57) ABSTRACT

A furniture member includes a base assembly, a frame assembly, a legrest mechanism, a support rod, and a sync mechanism. The frame assembly is movable relative to the base assembly among an upright position, a partially reclined position, and a fully reclined position. The legrest mechanism is movable relative to the frame assembly between a retracted position and a fully extended position. The support rod is supported by the frame assembly. The sync mechanism is coupled to and supported by the support rod. The sync mechanism is configured to prevent the frame assembly from moving from the upright position to the partially reclined position until the legrest mechanism reaches the fully extended position.

20 Claims, 26 Drawing Sheets

(51) Int. Cl.
*A47C 1/032* (2006.01)
*A47C 1/034* (2006.01)
*F16H 53/02* (2006.01)
*F16H 21/28* (2006.01)

(56) References Cited

U.S. PATENT DOCUMENTS

| | | |
|---|---|---|
| 1,414,637 A | 5/1922 | Gell |
| 2,473,895 A | 6/1949 | Mednick |
| 2,677,412 A | 5/1954 | Thomas |
| 2,719,572 A | 10/1955 | Goldberg |
| 2,772,723 A | 12/1956 | Tunnell |
| 3,096,121 A | 7/1963 | Knabusch et al. |
| 3,179,466 A | 4/1965 | Garrett |
| 3,191,990 A | 6/1965 | Rugg et al. |
| 3,302,969 A | 2/1967 | Mizelle et al. |
| 3,339,971 A | 9/1967 | Fletcher |
| 3,352,601 A | 11/1967 | Cycowicz |
| 3,567,280 A | 3/1971 | Bradshaw |
| 3,637,255 A | 1/1972 | Re |
| 3,638,995 A | 2/1972 | Flanagan et al. |
| 3,758,151 A | 9/1973 | Re |
| 3,815,954 A | 6/1974 | Rogers, Jr. et al. |
| 3,865,432 A | 2/1975 | Rogers, Jr. et al. |
| 3,880,462 A | 4/1975 | Mednick |
| 3,926,472 A | 12/1975 | Evans |
| 3,941,417 A | 3/1976 | Re |
| 3,945,449 A | 3/1976 | Ostrow |
| 4,077,663 A | 3/1978 | Cycowicz et al. |
| 4,099,776 A | 7/1978 | Crum et al. |
| 4,140,342 A | 2/1979 | Jones |
| 4,179,157 A | 12/1979 | Shoemaker et al. |
| 4,212,494 A | 7/1980 | Dabney |
| 4,212,495 A | 7/1980 | Gall |
| 4,216,991 A | 8/1980 | Holobaugh |
| 4,216,992 A | 8/1980 | Crum |
| 4,226,468 A | 10/1980 | Johnson |
| 4,226,473 A | 10/1980 | Johnson |
| 4,244,620 A | 1/1981 | Harrison et al. |
| 4,352,523 A | 10/1982 | Holobaugh, Jr. |
| 4,364,603 A | 12/1982 | Johnson |
| 4,367,895 A | 1/1983 | Pacitti et al. |
| 4,373,602 A | 2/1983 | Tomita et al. |
| 4,451,084 A | 5/1984 | Seeley |
| 4,492,407 A | 1/1985 | Broadhead |
| 4,519,647 A | 5/1985 | Rogers, Jr. |
| 4,570,996 A | 2/1986 | Rogers, Jr. |
| 4,582,435 A | 4/1986 | Davis |
| 4,586,749 A | 5/1986 | Nakatani |
| 4,601,513 A | 7/1986 | Pine |
| 4,650,211 A | 3/1987 | Tanahashi |
| 4,662,597 A | 5/1987 | Uecker et al. |
| 4,740,031 A | 4/1988 | Rogers, Jr. |
| 4,805,960 A | 2/1989 | Tacker |
| 4,818,018 A | 4/1989 | Yamasaki |
| 4,861,101 A | 8/1989 | Hartline |
| 4,895,411 A | 1/1990 | Pine |
| 4,915,444 A | 4/1990 | Rogers, Jr. |
| 4,932,927 A | 6/1990 | Fillar |
| 4,989,914 A | 2/1991 | Pine |
| 5,011,220 A | 4/1991 | LaPointe |
| 5,044,692 A | 9/1991 | Tidwell, Jr. et al. |
| 5,054,850 A | 10/1991 | Pine |
| 5,064,244 A | 11/1991 | Sproule |
| 5,072,988 A | 12/1991 | Plunk |
| 5,088,789 A | 2/1992 | LaPointe et al. |
| 5,123,705 A | 6/1992 | Johnson |
| 5,129,701 A | 7/1992 | Pine |
| 5,141,284 A | 8/1992 | LaPointe |
| 5,147,108 A | 9/1992 | LaPointe |
| 5,156,441 A | 10/1992 | Byersmith et al. |
| 5,171,000 A | 12/1992 | LaPointe et al. |
| 5,217,276 A * | 6/1993 | LaPointe ............ A47C 1/0355 297/85 L |
| 5,234,253 A | 8/1993 | LaPointe et al. |
| 5,238,295 A | 8/1993 | Harrell |
| 5,271,660 A | 12/1993 | LaPointe et al. |
| 5,312,153 A | 5/1994 | Lin |
| 5,323,526 A | 6/1994 | Saul et al. |
| 5,328,235 A | 7/1994 | Saul et al. |
| 5,348,367 A | 9/1994 | Mizelle |
| 5,360,255 A | 11/1994 | Cook et al. |
| 5,423,591 A | 6/1995 | LaPointe et al. |
| 5,435,621 A | 7/1995 | Komorowski et al. |
| 5,435,622 A | 7/1995 | Fay et al. |
| 5,480,209 A | 1/1996 | May |
| 5,480,213 A | 1/1996 | Sproule |
| 5,503,453 A | 4/1996 | Saul et al. |
| 5,527,095 A | 6/1996 | Marshall et al. |
| 5,567,009 A | 10/1996 | Fay et al. |
| 5,570,927 A | 11/1996 | LaPointe et al. |
| 5,570,930 A | 11/1996 | LaPointe et al. |
| 5,582,457 A | 12/1996 | Komorowski et al. |
| 5,597,209 A | 1/1997 | Bart et al. |
| 5,664,832 A | 9/1997 | Stevens et al. |
| 5,765,913 A | 6/1998 | LaPointe et al. |
| 5,772,278 A | 6/1998 | Kowalski |
| 5,775,775 A | 7/1998 | Hoffman |
| 5,806,920 A | 9/1998 | Blount |
| 5,806,921 A | 9/1998 | LaPointe et al. |
| 5,823,614 A | 10/1998 | Johnson et al. |
| 5,857,739 A | 1/1999 | Smith |
| 5,865,457 A | 2/1999 | Knabusch et al. |
| 5,954,392 A | 9/1999 | Liss et al. |
| 5,971,475 A | 10/1999 | Lawson et al. |
| 5,975,627 A | 11/1999 | LaPointe et al. |
| 5,992,930 A | 11/1999 | LaPointe et al. |
| 6,000,754 A | 12/1999 | Lawson |
| 6,030,033 A | 2/2000 | Schultz |
| 6,145,924 A * | 11/2000 | Mero, Jr. ............ A47C 1/0355 297/83 |
| 6,179,328 B1 | 1/2001 | Kawagoe et al. |
| 6,227,489 B1 | 5/2001 | Kitamoto et al. |
| 6,231,120 B1 | 5/2001 | Wiecek |
| 6,309,015 B1 | 10/2001 | Pine |
| 6,330,995 B1 | 12/2001 | Mangeiga et al. |
| 6,409,262 B1 | 6/2002 | LaPointe |
| 6,467,845 B1 | 10/2002 | Chen |
| 6,488,332 B1 | 12/2002 | Markwald |
| 6,491,342 B1 | 12/2002 | Smith |
| 6,655,732 B1 | 12/2003 | LaPointe |
| 6,827,401 B2 | 12/2004 | Marshall et al. |
| 6,939,076 B2 | 9/2005 | LaPointe |
| 6,988,769 B2 | 1/2006 | LaPointe |
| 7,261,367 B2 | 8/2007 | Duncan et al. |
| 7,275,789 B2 | 10/2007 | LaPointe |
| 7,311,359 B2 | 12/2007 | Smith |
| 7,338,132 B2 | 3/2008 | LaPointe |
| 7,357,450 B2 | 4/2008 | Rogers |
| 7,431,387 B2 | 10/2008 | LaPointe et al. |
| 7,475,944 B2 | 1/2009 | Griepentrog et al. |
| 7,552,970 B2 | 6/2009 | LaPointe |
| 7,585,018 B2 * | 9/2009 | LaPointe ............ A47C 1/0352 297/85 L |
| 7,637,571 B2 | 12/2009 | Okano et al. |
| 7,673,933 B2 | 3/2010 | Lawson |
| 7,731,276 B2 | 6/2010 | Hoffman et al. |
| 7,823,966 B2 | 11/2010 | Buchholz |
| 7,850,232 B2 * | 12/2010 | Casteel ............ A47C 1/0352 297/85 L |
| 8,132,855 B2 | 3/2012 | Richard |
| 8,308,228 B2 | 11/2012 | Lawson et al. |
| 8,573,687 B2 | 11/2013 | Lawson et al. |
| 8,590,964 B2 | 11/2013 | Murphy et al. |
| 8,616,627 B2 * | 12/2013 | Murphy ............ A47C 1/0355 297/85 L |
| 8,622,467 B2 | 1/2014 | Murphy et al. |
| 8,696,054 B2 | 4/2014 | Crum |
| 9,314,101 B2 | 4/2016 | Harwood et al. |
| 9,357,847 B2 | 6/2016 | Murphy |
| 9,433,295 B2 | 9/2016 | Crum |
| 9,635,943 B2 | 5/2017 | Lawson |
| 9,655,450 B2 | 5/2017 | Marshall et al. |
| 9,655,451 B2 | 5/2017 | Harwood et al. |

(56) References Cited

U.S. PATENT DOCUMENTS

| | | |
|---|---|---|
| 9,808,090 B2 | 11/2017 | Carrera |
| 9,986,832 B2 | 6/2018 | LaPointe et al. |
| 9,986,835 B2 | 6/2018 | LaPointe et al. |
| 10,092,106 B2 | 10/2018 | LaPointe et al. |
| 10,485,347 B2 * | 11/2019 | Lawson ............... A47C 1/0355 |
| 10,492,613 B2 | 12/2019 | LaPointe et al. |
| 10,512,332 B2 | 12/2019 | LaPointe et al. |
| 10,512,333 B2 | 12/2019 | Lawson et al. |
| 10,524,574 B2 | 1/2020 | LaPointe et al. |
| 10,524,575 B2 | 1/2020 | LaPointe |
| 10,537,178 B2 | 1/2020 | Marshall et al. |
| 10,568,428 B2 | 2/2020 | Marshall et al. |
| 10,709,246 B2 | 7/2020 | Murphy |
| 10,750,870 B2 | 8/2020 | Marshall et al. |
| 10,779,653 B2 | 9/2020 | LaPointe et al. |
| 10,820,708 B2 * | 11/2020 | LaPointe ................ A47C 7/506 |
| 10,890,235 B2 * | 1/2021 | Bucove .................. A47C 1/026 |
| 11,197,549 B1 * | 12/2021 | LaPointe ............. A47C 1/0352 |
| 2001/0026088 A1 | 10/2001 | Robinson |
| 2003/0057743 A1 | 3/2003 | May |
| 2004/0000803 A1 | 1/2004 | Guillot et al. |
| 2005/0035632 A1 | 2/2005 | Tseng |
| 2005/0067867 A1 | 3/2005 | May |
| 2006/0061147 A1 | 3/2006 | Johnson et al. |
| 2006/0103202 A1 | 5/2006 | Maki et al. |
| 2006/0249992 A1 | 11/2006 | LaPointe et al. |
| 2006/0249993 A1 | 11/2006 | Rogers |
| 2007/0040419 A1 | 2/2007 | LaPointe et al. |
| 2007/0085395 A1 | 4/2007 | LaPointe |
| 2007/0241589 A1 | 10/2007 | LaPointe |
| 2008/0129006 A1 | 6/2008 | Johnson et al. |
| 2008/0150329 A1 | 6/2008 | Lawson |
| 2009/0284054 A1 | 11/2009 | Humer et al. |
| 2011/0016627 A1 | 1/2011 | Blevins et al. |
| 2011/0175426 A1 | 7/2011 | Lawson |
| 2011/0233972 A1 | 9/2011 | Weicek |
| 2011/0248544 A1 | 10/2011 | Adams et al. |
| 2011/0248545 A1 * | 10/2011 | LaPointe ............. A47C 1/0355 297/85 M |
| 2011/0248547 A1 | 10/2011 | LaPointe et al. |
| 2011/0304193 A1 | 12/2011 | Murphy et al. |
| 2012/0193946 A1 | 8/2012 | Robertson |
| 2013/0062914 A1 | 3/2013 | Marshall et al. |
| 2013/0140855 A1 | 6/2013 | Murphy et al. |
| 2013/0140856 A1 | 6/2013 | Murphy et al. |
| 2013/0175847 A1 | 7/2013 | Lawson |
| 2014/0049079 A1 | 2/2014 | Lawson et al. |
| 2014/0049084 A1 | 2/2014 | Lawson et al. |
| 2014/0070585 A1 | 3/2014 | LaPointe |
| 2014/0103688 A1 | 4/2014 | Wilson |
| 2014/0246819 A1 | 9/2014 | Harwood et al. |
| 2014/0312660 A1 | 10/2014 | Natuzzi et al. |
| 2014/0333099 A1 | 11/2014 | Lu et al. |
| 2014/0368011 A1 | 12/2014 | LaPointe |
| 2015/0196123 A1 | 7/2015 | Buehrer |
| 2015/0250320 A1 | 9/2015 | Arceci et al. |
| 2015/0272329 A1 | 10/2015 | Lawson |
| 2015/0282619 A1 | 10/2015 | Lawson |
| 2016/0058195 A1 | 3/2016 | Huang et al. |
| 2016/0100687 A1 | 4/2016 | Murphy et al. |
| 2016/0120315 A1 | 5/2016 | Robertson |
| 2016/0192779 A1 | 7/2016 | Harwood et al. |
| 2016/0206097 A1 | 7/2016 | Rivera |
| 2016/0270537 A1 | 9/2016 | Marshall et al. |
| 2016/0302573 A1 | 10/2016 | Garland et al. |
| 2016/0325838 A1 | 11/2016 | Erhel |
| 2016/0376007 A1 | 12/2016 | Meindlhumer |
| 2017/0013961 A1 | 1/2017 | LaPointe et al. |
| 2017/0042330 A1 | 2/2017 | Bruce et al. |
| 2017/0101188 A1 | 4/2017 | Auge et al. |
| 2017/0150818 A1 | 6/2017 | Contreras |
| 2017/0347796 A1 | 12/2017 | LaPointe et al. |
| 2017/0367483 A1 | 12/2017 | Fecker et al. |
| 2018/0070725 A1 | 3/2018 | LaPointe et al. |
| 2018/0078039 A1 | 3/2018 | LaPointe et al. |
| 2018/0206644 A1 | 7/2018 | Murphy |
| 2018/0228290 A1 | 8/2018 | Kiwak et al. |
| 2018/0289156 A1 | 10/2018 | Marshall et al. |
| 2018/0289157 A1 | 10/2018 | Marshall et al. |
| 2018/0289158 A1 | 10/2018 | Marshall et al. |
| 2019/0029436 A1 | 1/2019 | Lin |
| 2019/0082849 A1 | 3/2019 | LaPointe et al. |
| 2019/0116981 A1 | 4/2019 | LaPointe et al. |
| 2019/0290004 A1 | 9/2019 | Lawson et al. |
| 2019/0313796 A1 | 10/2019 | LaPointe |
| 2019/0350362 A1 | 11/2019 | LaPointe et al. |
| 2019/0350368 A1 | 11/2019 | LaPointe et al. |
| 2020/0163458 A1 | 5/2020 | Murphy |
| 2020/0352333 A1 | 11/2020 | LaPointe et al. |
| 2021/0022506 A1 | 1/2021 | Murphy |
| 2021/0100364 A1 | 4/2021 | Murphy |
| 2021/0169234 A1 | 6/2021 | Jacobs et al. |

FOREIGN PATENT DOCUMENTS

| | | |
|---|---|---|
| CN | 2168480 Y | 6/1994 |
| CN | 200976974 Y | 11/2007 |
| CN | 104936483 A | 9/2015 |
| CN | 105208896 A | 12/2015 |
| DE | 623960 C | 1/1936 |
| DE | 29707946 U1 | 7/1997 |
| EP | 1504697 A1 | 2/2005 |
| JP | S53147329 A | 12/1978 |
| JP | H04259403 A | 9/1992 |
| JP | H08266370 A | 10/1996 |
| JP | H1146920 A | 2/1999 |
| JP | 2001054443 A | 2/2001 |
| JP | 2003070583 A | 3/2003 |
| JP | 2003260097 A | 9/2003 |
| JP | 2004065507 A | 3/2004 |
| JP | 3125308 U | 9/2006 |
| JP | 2008132141 A | 6/2008 |
| JP | 2012070787 A | 4/2012 |
| JP | 2013172804 A | 9/2013 |
| JP | 2014147849 A | 8/2014 |
| JP | 3198305 U | 6/2015 |
| KR | 20060036132 A | 4/2006 |
| KR | 100807370 B1 | 2/2008 |
| KR | 101245357 B1 | 3/2013 |
| TW | 374704 B | 11/1999 |
| WO | WO-9611612 A1 | 4/1996 |
| WO | WO-2008-008235 A2 | 1/2008 |
| WO | WO-2011094478 A1 | 8/2011 |
| WO | WO-2012162499 A1 | 11/2012 |
| WO | WO-2015066030 A1 | 5/2015 |
| WO | WO-2016092248 A1 | 6/2016 |
| WO | WO-2017155069 A1 | 9/2017 |
| WO | WO-2020-118009 A1 | 6/2020 |

OTHER PUBLICATIONS

International Search Report and Written Opinion of the International Searching Authority for Application No. PCT/US2006/031852, dated Jun. 17, 2008.

First Examination Report for New Zealand Application No. 565885, dated Oct. 7, 2009.

International Search Report and Written Opinion of the International Searching Authority for Application No. PCT/US2014/019455, dated May 26, 2014.

International Search Report and Written Opinion of the International Searching Authority for Application No. PCT/US2016/021361, dated May 30, 2016.

International Search Report and Written Opinion of the International Searching Authority for Application No. PCT/US2016/032967, dated Aug. 19, 2016.

International Search Report and Written Opinion of the International Searching Authority for Application No. PCT/US2017/035976, dated Aug. 25, 2017.

International Search Report and Written Opinion of the International Searching Authority for Application No. PCT/US2017/043899, dated Nov. 8, 2017.

(56) References Cited

OTHER PUBLICATIONS

First Examination Report for New Zealand Application No. 735460, dated Mar. 2, 2018.
Office Action for Canadian Application No. 2,896,885, dated Mar. 8, 2018.
International Search Report and Written Opinion of the International Searching Authority for Application No. PCT/US2018/025467, dated Jul. 17, 2018.
European Search Report for Application No. 16765435.9, dated Sep. 5, 2018.
European Search Report for Application No. 18159817.8, dated Sep. 26, 2018.
Office Action for Canadian Application No. 2,896,885, dated Oct. 18, 2018.
European Search Report for Application No. 16824840.9, dated Dec. 7, 2018.
First Examination Report for New Zealand Application No. 738919, dated Mar. 14, 2019.
European Search Report for Application No. 19158581.9, dated May 3, 2019.
International Search Report and Written Opinion of the International Searching Authority for Application No. PCT/US2019/021568, dated Jun. 20, 2019.
First Examination Report for Australian Application No. 2016294155, dated Nov. 21, 2019.
First Examination Report for Indian Application No. 201817001204, dated Jan. 3, 2020.
International Search Report and Written Opinion of the International Searching Authority for Application No. PCT/US2019/064607, dated Mar. 26, 2020.
Office Action for Taiwanese Application No. 106116858, dated Apr. 10, 2020. Translation provided by Lee and Li, Attorneys-at-Law.
First Examination Report for Indian Application No. 201717033062, dated Apr. 24, 2020.
International Search Report and Written Opinion of the International Searching Authority for Application No. PCT/US2020/032159, dated Aug. 14, 2020.
Office Action for Taiwanese Application No. 107109634, dated Apr. 19, 2021. Translation provided by Lee and Li, Attorneys-at-Law.

* cited by examiner

WALL-PROXIMITY FURNITURE MEMBER HAVING SYNC MECHANISM

CROSS-REFERENCE TO RELATED APPLICATIONS

This application is a continuation of U.S. patent application Ser. No. 17/034,789 filed on Sep. 28, 2020. The entire disclosure of the above application is incorporated herein by reference.

FIELD

The present disclosure relates to a wall-proximity furniture member having a sync mechanism.

BACKGROUND

This section provides background information related to the present disclosure and is not necessarily prior art.

Conventional reclining chairs or sofas must be positioned far enough away from a wall or any other object in a room to provide enough space behind the chair or sofa so that the wall or other object does not restrict the ability of a seatback of the chair or sofa to move into a fully reclined position. This can result in the user having to position the chair or sofa farther away from the wall than he or she would choose to position a non-reclining chair or sofa in order to leave space for the seatback to fully recline. The present disclosure provides a furniture member that translates a frame assembly of the furniture member forward as the seatback reclines, such that a distance between the wall and the seatback is the same or nearly the same in both an upright position and in a fully reclined position.

SUMMARY

This section provides a general summary of the disclosure, and is not a comprehensive disclosure of its full scope or all of its features.

In one form, the present disclosure discloses a furniture member that includes a base assembly, a frame assembly, a legrest mechanism, a support rod and a sync mechanism. The frame assembly is movable relative to the base assembly among an upright position, a partially reclined position and a fully reclined position. The legrest mechanism is movable relative to the frame assembly between a retracted position and a fully extended position. The support rod is supported by the frame assembly. The sync mechanism coupled to and supported by the support rod. The sync mechanism is configured to prevent the frame assembly from moving from the upright position to the partially reclined position until the legrest mechanism reaches the fully extended position.

In some configurations of the furniture member of the above paragraph, an actuator powers movement of the legrest mechanism between the retracted position and the fully extended position, and movement of the frame assembly among the upright position, the partially reclined position and the fully reclined position.

In some configurations of the furniture member of any one or more of the above paragraphs, the frame assembly moves forward relative to the base assembly when the frame assembly moves from the partially reclined position toward the fully reclined position.

In some configurations of the furniture member of any one or more of the above paragraphs, the frame assembly includes a body frame, a seat bottom frame and a seatback frame rotatably coupled to the seat bottom frame. The seat bottom frame is moveable relative to the body frame and the base assembly.

In some configurations of the furniture member of any one or more of the above paragraphs, the furniture member further includes a drive rod and an actuator. The drive rod is rotatably supported by the frame assembly. The actuator drives the drive rod to power movement of the legrest mechanism between the retracted position and the fully extended position, and movement of the frame assembly among the upright position, the partially reclined position and the fully reclined position.

In some configurations of the furniture member of any one or more of the above paragraphs, driving the drive rod to power movement of the legrest mechanism includes rotating the drive rod to move the legrest mechanism from the retracted position to the fully extended position. Driving the drive rod to power movement of the frame assembly includes rotating the drive rod to move the frame assembly from the upright position to the partially reclined position and translating the drive rod to move the frame assembly from the partially reclined position to the fully reclined position.

In some configurations of the furniture member of any one or more of the above paragraphs, first and second braces are coupled to the frame assembly and the drive rod to further support the drive rod. The first and second braces cooperate to form a V-shape.

In some configurations of the furniture member of any one or more of the above paragraphs, a seat push link mechanism moves the frame assembly from the partially reclined position to the fully reclined position.

In another form, the present disclosure discloses a furniture member that includes a frame assembly, a support rod, and a sync mechanism. The frame assembly includes a body frame, a seatback frame and a seat bottom frame. The seatback frame being rotatably coupled to the body frame. The seat bottom frame being movably coupled to the seatback frame such that movement of the seat bottom frame relative to the body frame causes corresponding rotation of the seatback frame. The support rod is supported by the body frame. The sync mechanism includes a pair of cams that are rotatably coupled to and supported by the support rod. The pair of cams are rotatable between a first position in which the pair of cams prevent the seat bottom frame from moving relative to the body frame and a second position in which the pair of cams allow the seat bottom frame to move relative to the body frame.

In some configurations of the furniture member of the above paragraph, each of the pair of cams includes an outer surface profile having a first surface and a second surface. The first surface and the second surface are angled between 20 degrees and 85 degrees with respect to each other.

In some configurations of the furniture member of any one or more of the above paragraphs, the sync mechanism includes a pair of first rollers and the pair of cams include outer surface profiles. The pair of first rollers are configured to rotate along the outer surface profiles as the cams rotate between the first and second positions.

In some configurations of the furniture member of any one or more of the above paragraphs, the outer surface profiles include a first surface and a second surface. The first pair of rollers are in contact with the first surface when the pair of cams are in the first position and are in contact with the second surface when the pair of cams are in the second position.

In some configurations of the furniture member of any one or more of the above paragraphs, a pair of reinforcing brackets are fixed to the seat bottom frame at opposing sides thereof. The pair of first rollers are rotatably coupled to the pair of reinforcing brackets.

In some configurations of the furniture member of any one or more of the above paragraphs, the sync mechanism includes a pair of second rollers and the pair of cams include pockets having inner surface profiles. The pair of second rollers are configured to rotate along the inner surface profiles as the pair of cams rotate between the first and second positions.

In some configurations of the furniture member of any one or more of the above paragraphs, the inner surface profiles are arcuate.

In some configurations of the furniture member of any one or more of the above paragraphs, the furniture member further includes a drive rod and the sync mechanism further includes a pair of sync drive-rod links and a pair of cam links. The pair of sync drive-rod links drivingly engaged with the drive rod and rotatably coupled to the pair of cam links. The pair of cam links rotatably coupled to the pair of cams. Rotating the drive rod causes the pair of cams to rotate about the support rod between the first position and the second position.

In some configurations of the furniture member of any one or more of the above paragraphs, an actuator is configured to rotate the drive rod.

In some configurations of the furniture member of any one or more of the above paragraphs, first and second braces are coupled to the frame assembly and the drive rod to further support the drive rod. The first and second braces cooperate to form a V-shape.

In some configurations of the furniture member of any one or more of the above paragraphs, the furniture member further includes a drive rod and a seat push link mechanism. The drive rod is rotatably supported by the frame assembly and is rotatable about a first rotational axis. The seat push link mechanism includes a pair of lower front drive links, a pair of upper front drive links, and a pair of connecting links. The pair of lower front drive links are rotatably coupled to a base assembly and are rotatable about a second rotational axis. The pair of upper front drive links are rotatably coupled to the pair of lower front drive links and are rotatable about a third rotational axis. The pair of connecting links are rotatably coupled to the pair of upper front drive links.

In some configurations of the furniture member of any one or more of the above paragraphs, the sync mechanism includes a first pair of rollers rotatably coupled to the pair of connecting links and a second pair of rollers also rotatably coupled to the pair of connecting links. The first pair of rollers are configured to rotate along first surface profiles of the pair of cams and the second pair of rollers are configured to rotate along second surface profiles of the pair of cams.

In some configurations of the furniture member of any one or more of the above paragraphs, when the pair of cams are in the first position, a straight line extends through the first rotational axis and the second rotational axis. Lance stops extending from the pair of lower front drive links engage the pair of upper front drive links to prevent the third rotational axis from aligning with or being positioned above the straight line.

In some configurations of the furniture member of any one or more of the above paragraphs, the pair of cams have a triangular-shape.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
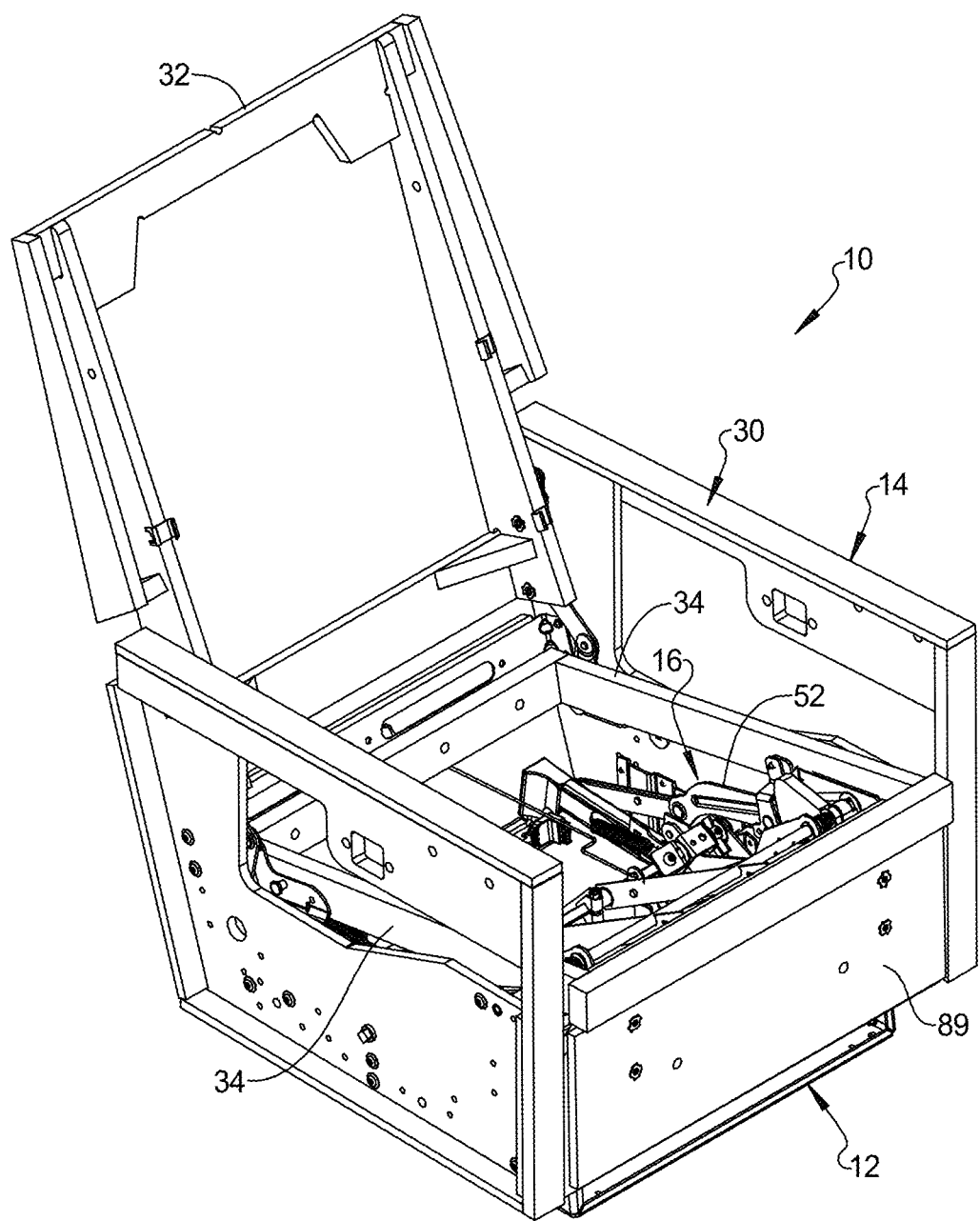
FIG. 1 is a perspective view of a furniture member showing legrest retracted, frame assembly un-tilted and seatback upright according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 25:
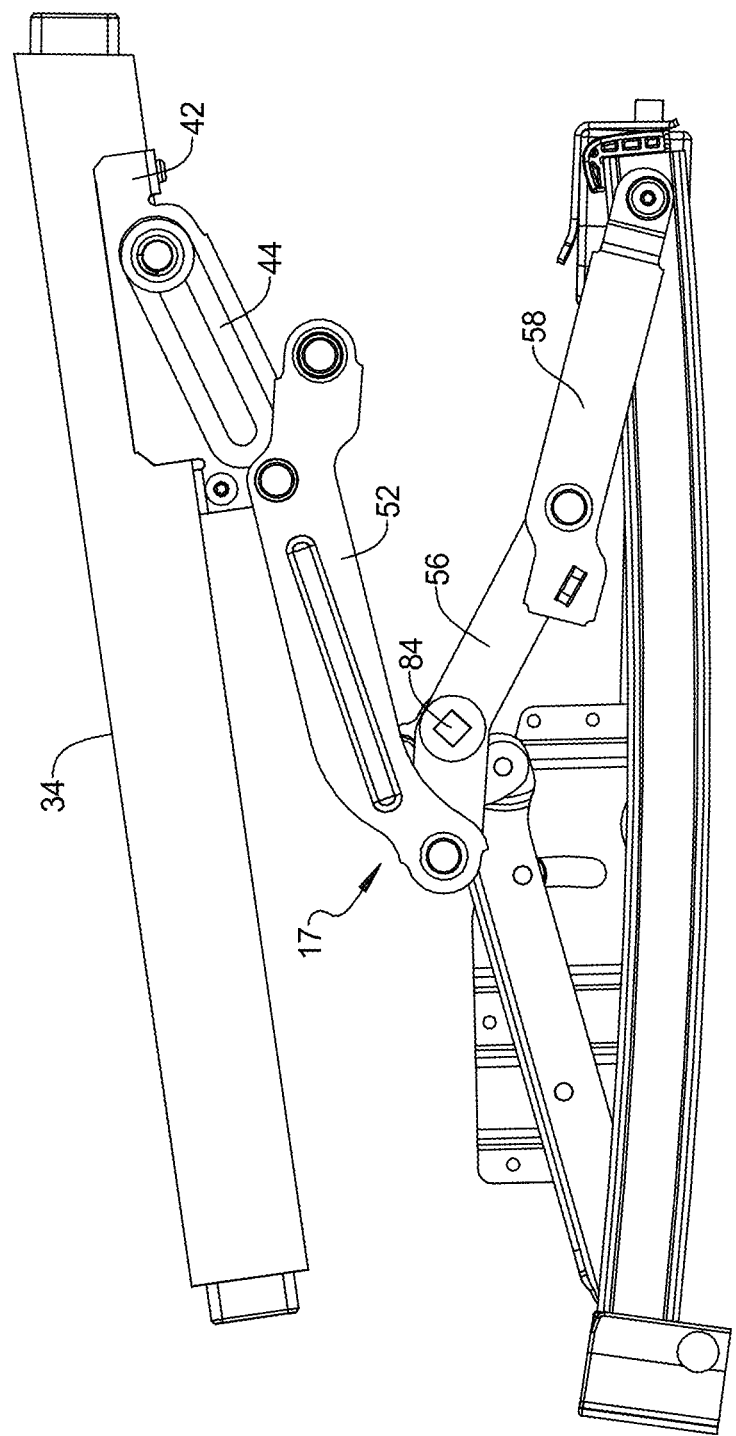
FIG. 25 is a side view of the seat push link mechanism when the seatback is upright.
Figure 26:
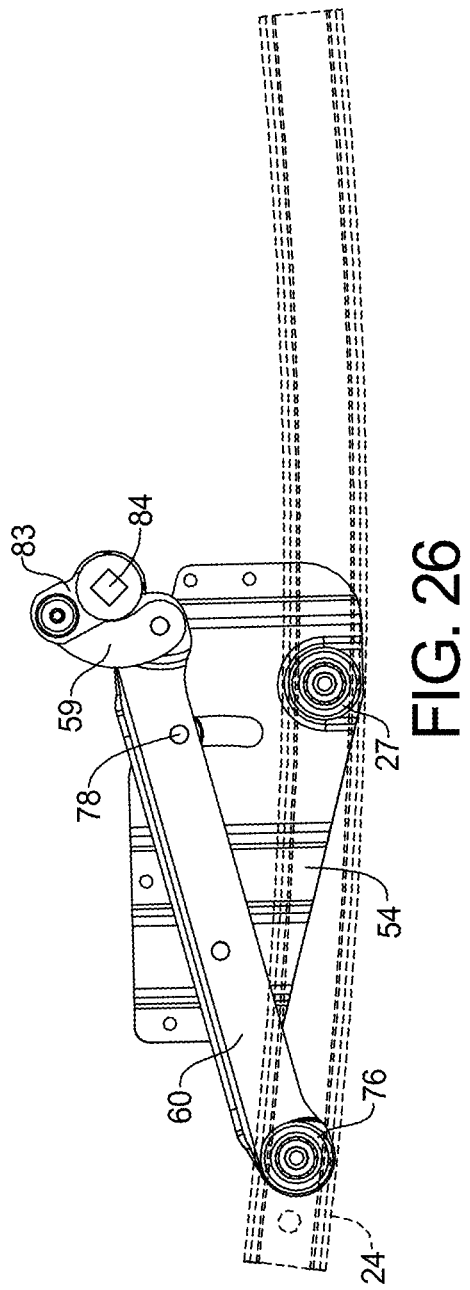
FIG. 26 is a side view of a tilt mechanism of the furniture member when the frame assembly is un-tilted.

With reference to FIGS. 1-26, a furniture member 10 is provided that may include a base assembly 12 (FIG. 4), a frame assembly 14 (FIG. 1), a tilt mechanism 16 (FIGS. 2-4), a seat push link mechanism 17 (FIG. 25), legrest mechanism 18 (FIGS. 2 and 3) and a sync mechanism 19 (FIGS. 5 and 10-12). The base assembly 12 supports the frame assembly 14, the tilt mechanism 16 and the legrest mechanism 18 while the base assembly 12 remains stationary relative to a support surface (e.g., a floor or ground) upon which the furniture member 10 is situated. As will be described in more detail below, the frame assembly 14 is movable relative to the base assembly 12 among an upright position (FIGS. 1-5), a pre-reclined position (FIGS. 7-10), a partially reclined position (FIGS. 13-16) and a fully reclined position (FIGS. 21-24). The legrest mechanism 18 is movable relative to the frame assembly 14 between a retracted position (FIGS. 1-5) and a fully extended position (FIGS. 13-24).

The base assembly 12 may include a front support member 20, a rear support member 22 and a pair of rails 24. The front and rear support members 20, 22 can include a plurality of feet (not shown) that contact the support surface. The rails 24 extend parallel to each other and between the front and rear support members 20, 22 and are fixedly attached to the front and rear support members 20, 22. Each of the rails 24 includes a curved track channel 26 that may extend through an entire length of the rail 24. A stop plug 25 (FIGS. 8 and 14) may be at least partially received in a front end of each track channel 26. The stop plug 25 may be press fit into the track channel 26 and/or otherwise fixed to the rails 24, and may contact a front bearing 27 of the tilt mechanism 16 when the furniture member 10 is in the fully reclined position.

The frame assembly 14 may include a chair body or body frame 30, a seatback frame 32 and a seat bottom frame 34. The seatback frame 32 is rotatable relative to the body frame 30 and the seat bottom frame 34 between the upright position and the fully reclined position. The seatback frame 32 is pivotably coupled to the body frame 30 by a pair of swing links 36. Each swing link 36 is pivotably coupled to a rear arm 40. The seat bottom frame 34 is supported by the rear arms 40 and a pair of front arms or sliders 42. The rear arms 40 and the front arms 42 are made of a metallic material. A polymeric linear bushing 44 is coupled to a respective front arm 42 and includes a slot 48. The slots 48 slidably engage a support rod 50 attached to the body frame 30. In some configurations, the front arm 42 may be a unitary component that defines the slot 48.

The rear arms 40 and the front arms 42 cooperate to support the seat bottom frame 34. When the seat bottom frame 34 and the sliders 42 move forward relative to the body frame 30, the seatback frame 32 rotates relative to the seat bottom frame 34 between the upright position and reclined positions, and the slots 48 in the front arms 42 slide along the support rod 50 (compare FIGS. 3 and 22).

Figure 2:
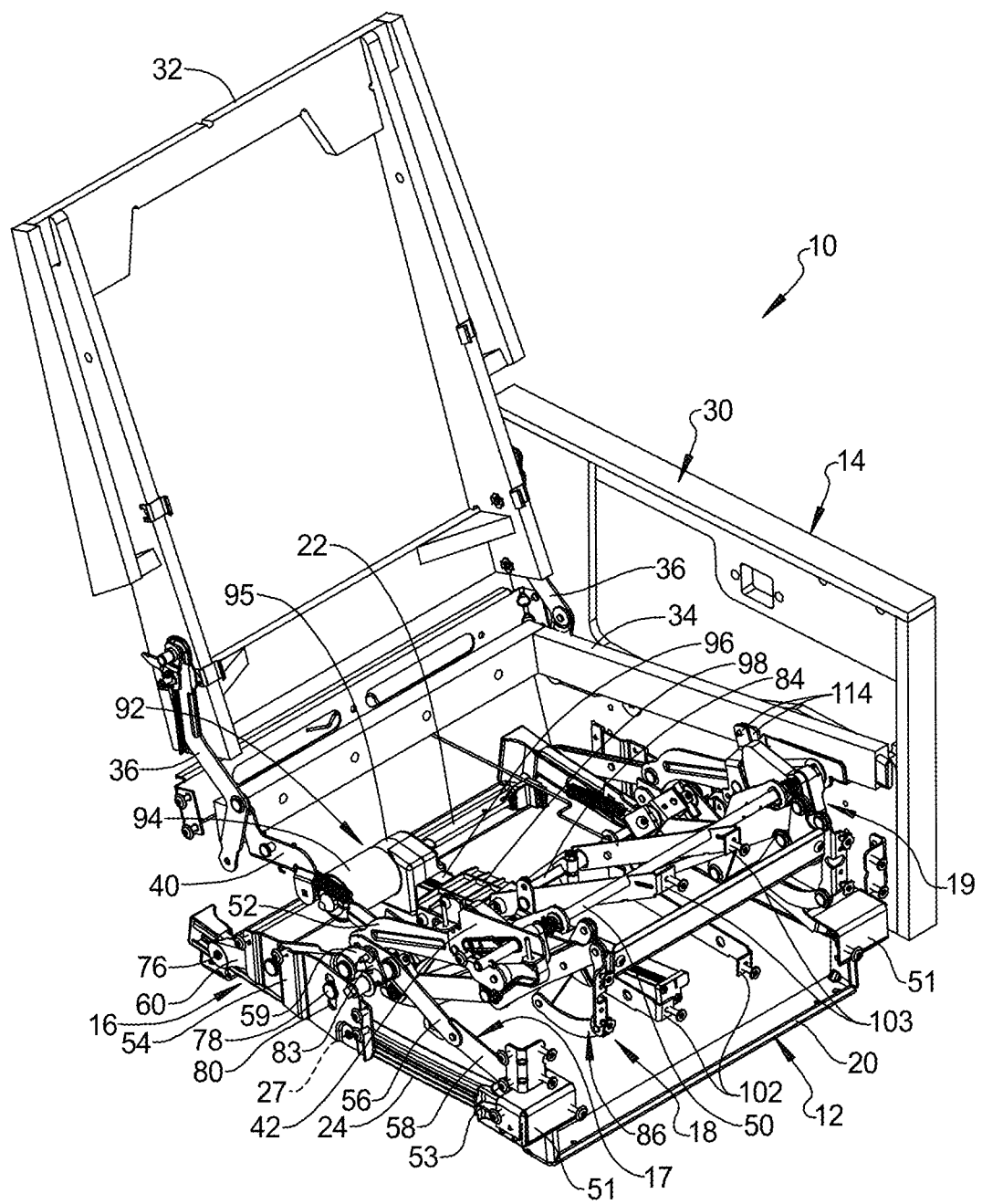
FIG. 2 is another perspective view of the furniture member showing legrest retracted, frame assembly un-tilted and seatback upright with portions of the frame assembly of the furniture member removed for clarity.
Figure 3:
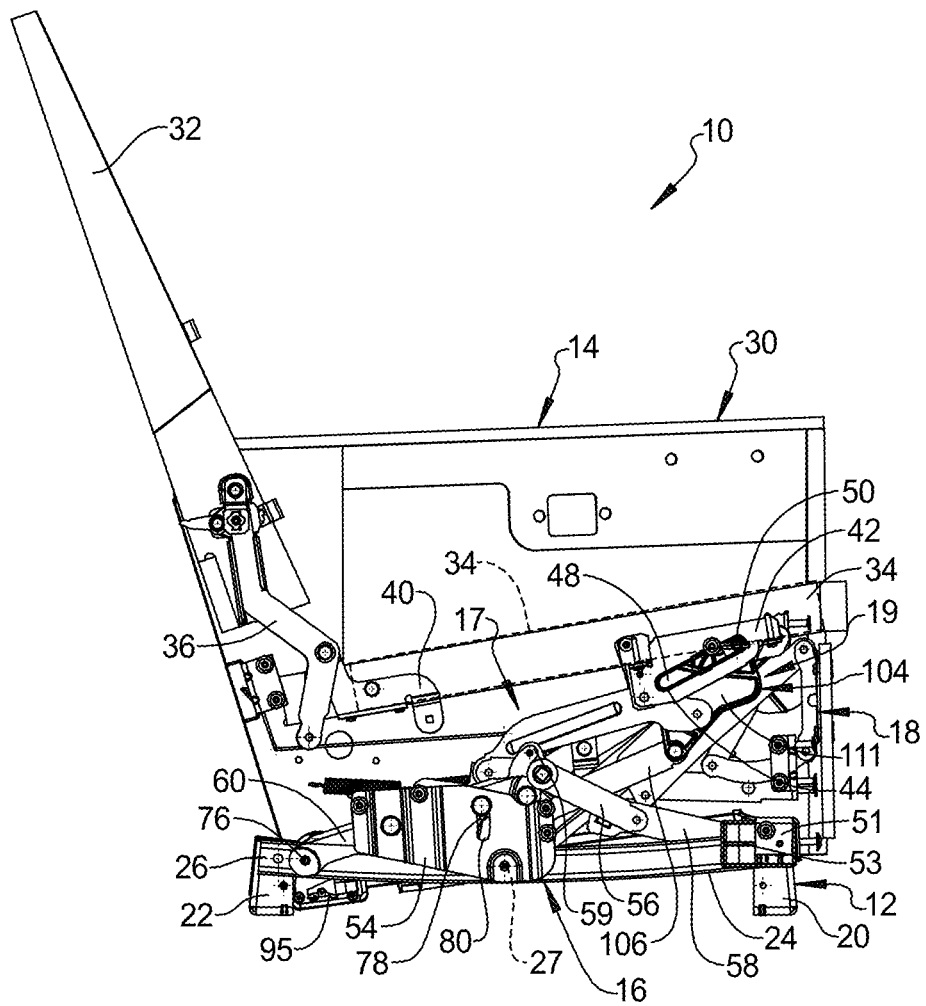
FIG. 3 is a side view of the furniture member showing legrest retracted, frame assembly un-tilted and seatback upright with portions of the frame assembly removed for clarity.

As shown in FIGS. 2 and 3, the frame assembly 14 may also include a pair of base stop members 51 and a pair of side stop members 53. The base stop members 51 may be fixedly attached to a front board 55 of the body frame 30. The base stop members 51 may include generally L-shaped profiles. The base stop members 51 may each include first and second legs that are approximately perpendicular to each other or angled relative to each other to form the generally L-shaped profile of the base stop member 51. The side stop members 53 may be fixedly attached to the base stop members 51 and/or to the body frame 30.

Figure 6:
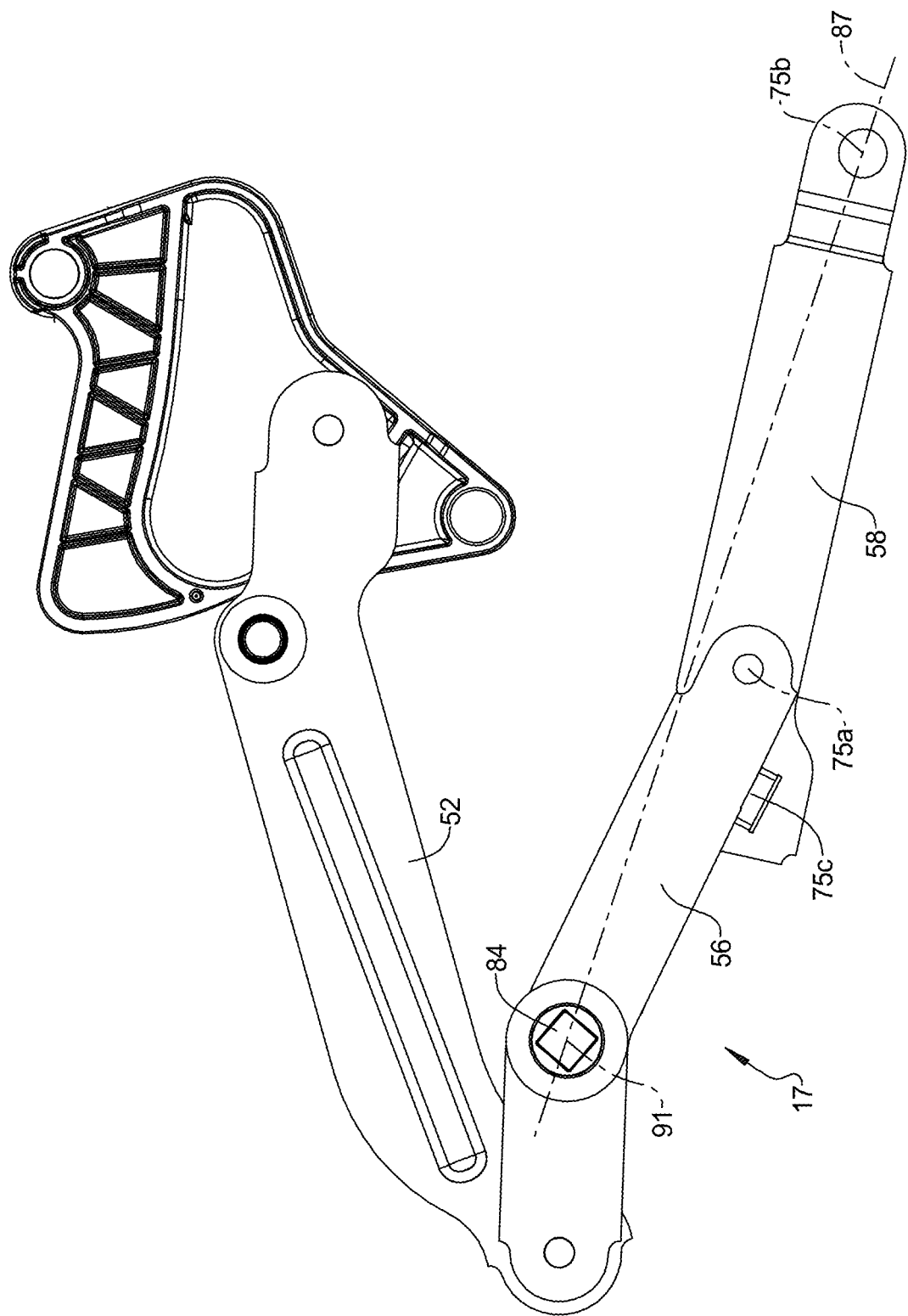
FIG. 6 is a side view of a seat push link mechanism of the furniture member when the seatback is upright.
Figure 7:
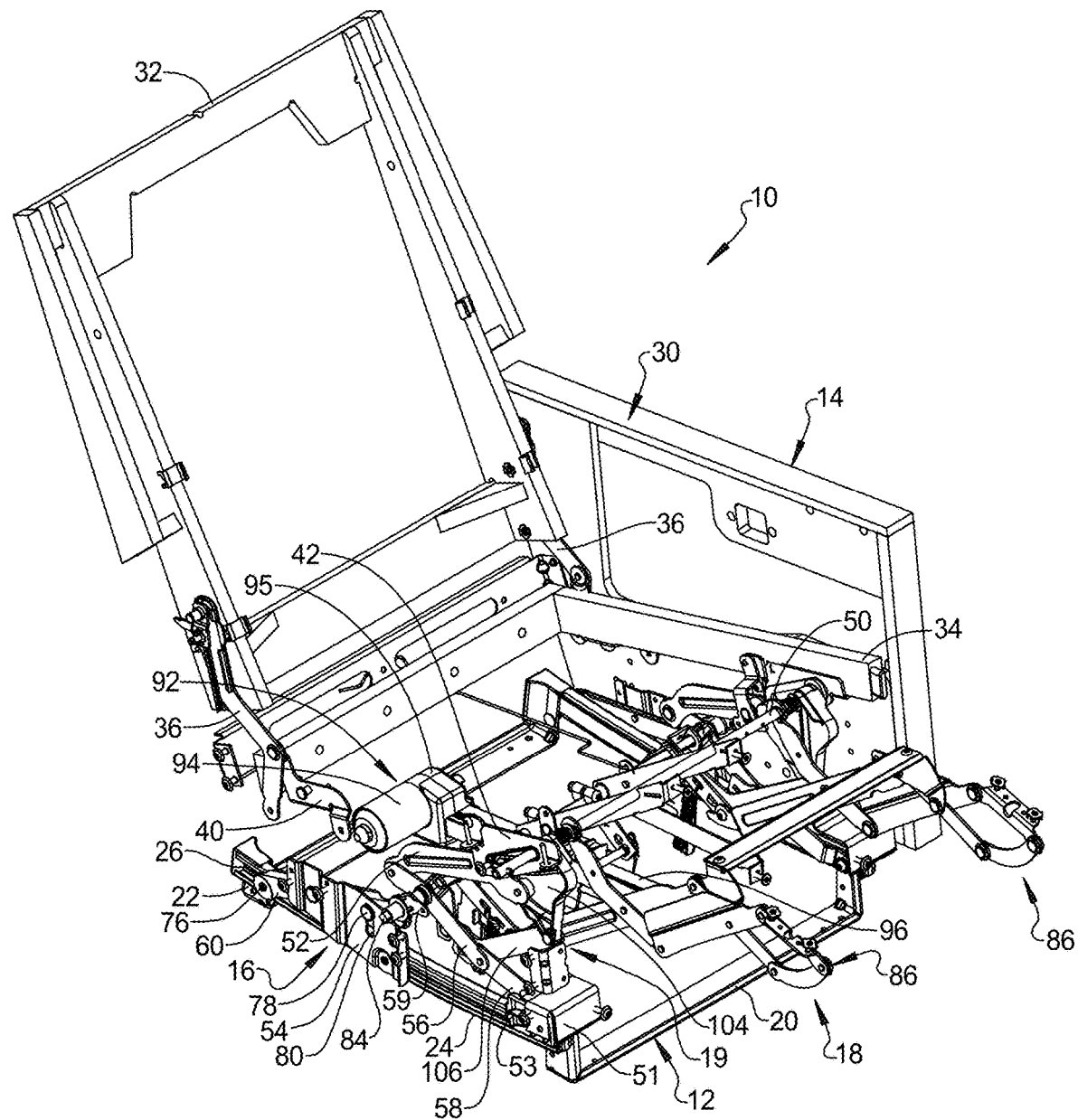
FIG. 7 is a perspective view of the furniture member showing legrest substantially extended, frame assembly partially tilted, and seatback pre-reclined with portions of the frame assembly removed for clarity.

The seat push link mechanism 17 includes a pair of connecting links 52, a pair of upper front drive links 56, and a pair of lower front drive links 58. The upper connecting links 52 are pivotably connected to the front arms 42 and pivotably connected at a second end to a first end of the upper front drive links 56. A second end of each upper front drive link 56 is pivotably coupled to a first end of each lower front drive link 58 and is rotatable or pivotable about rotational axis 75a (FIG. 6). A second end of each lower front drive link 58 is pivotably coupled to a corresponding one of the rails 24 of the base assembly 12 and is rotatable or pivotable about rotational axis 75b (FIG. 6). When the body frame 30 is between the upright position and the pre-reclined position, the links 56, 58 are oriented such that the rotational axis 75a is minimally offset from (i.e., positioned below) a straight line 87 extending through a rotational axis 91 of a drive rod 84 and the rotational axis 75b (FIG. 6). Stopping lance 75c extending from links 58 prevents rotational axis 75a from aligning with line 87 (stopping lance 75c is configured to abut against links 56, thereby preventing axis 75a from aligning with line 87). If rotational axis 75a aligned with line 87, the sync mechanism 19 would not be able to move links 56, 58 when the body frame 30 is moved from the upright position with respect to the base assembly 12. Without the links 56, 58 coupled to the sync mechanism 19, when the actuator is partially extended, either the legrest mechanism 18 could raise or the body frame 30 could move forward with respect to the base assembly 12. With the sync mechanism 19 and the links 56, 58 oriented as shown, the body frame 30 cannot move significantly with respect to the base assembly 12. If the user applies force to the legrest mechanism 18 while it is partially extended, the links 56, 58 minimize relative motion between the body frame 30 and the base assembly 12 while the positioning of the axes 75a, 75b, 91 minimizes the forces applied to the sync mechanism 19.

Figure 8:
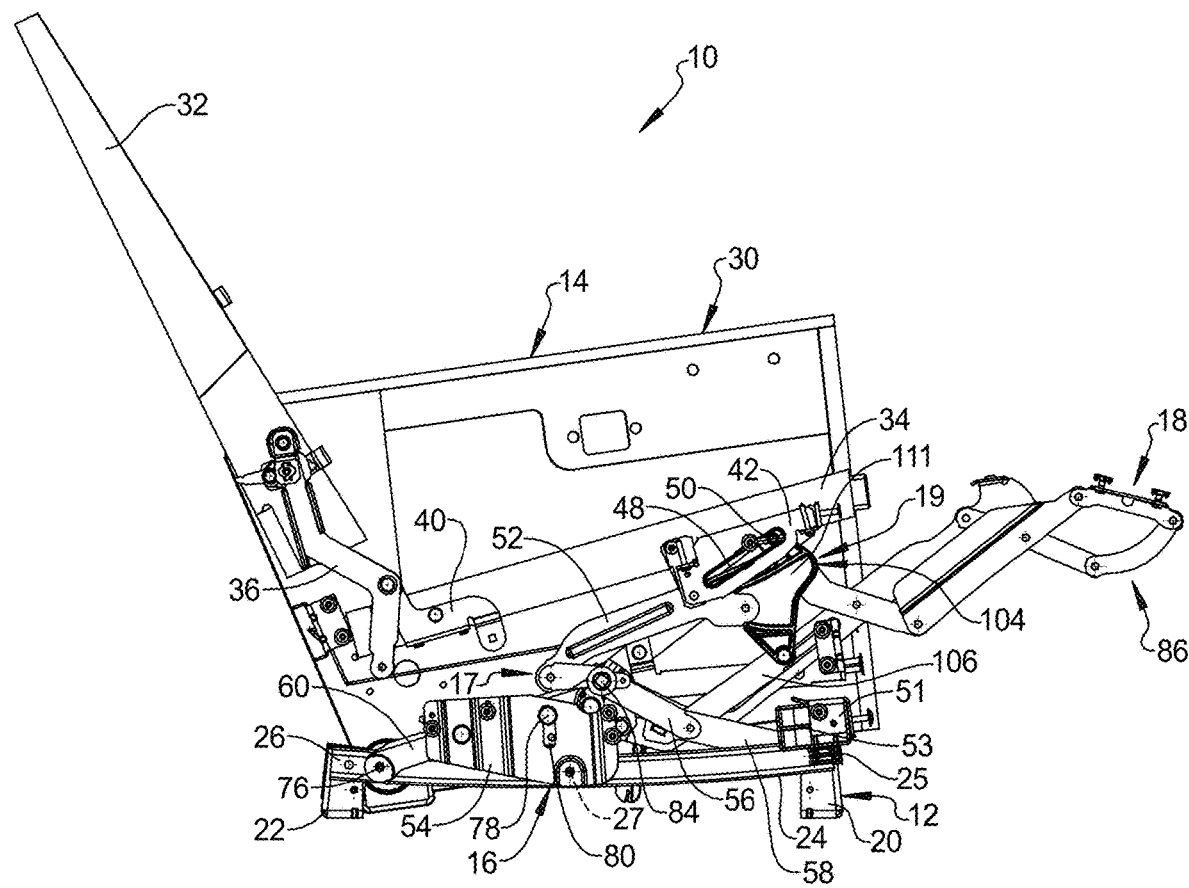
FIG. 8 is side view of the furniture member showing legrest substantially extended, frame assembly partially tilted, and seatback pre-reclined with portions of the frame assembly removed for clarity.

As shown in FIGS. 3 and 8, the tilt mechanism 16 includes a pair of side plates 54 and a pair of tilt rear drive links 60. The pair of side plates 54 are fixedly attached to the body frame 30 and each include the front bearing 27 that slidably or rollingly engages the track channel 26. Each of the tilt rear drive links 60 include a rear bearing 76 that slidably or rollingly engages the track channel 26. Each tilt rear drive link 60 also includes a rivet 78 that slidably engages a slot 80 in the corresponding side plate 54. Tilt coupling links 59 and tilt drive links 83 (FIG. 2) connect the tilt rear drive links 60 to the drive rod 84 of the legrest mechanism 18. Rotation of the drive rod 84 causes the tilt rear drive links 60 to rotate relative to the side plates 54, thereby generating a tilting motion of frame assembly 14.

The legrest mechanism 18 may include a pair of pantograph linkages 86. Such rotation of the drive rod 84 causes the pantograph linkages 86 to move between the retracted position and the fully extended position. A legrest platform 89 is attached to and supported by the pantograph linkages 86 such that a user may rest his or her legs and/or feet on the legrest platform 89 while sitting in the furniture member 10 while the legrest mechanism 19 is in the fully extended position.

Figure 4:
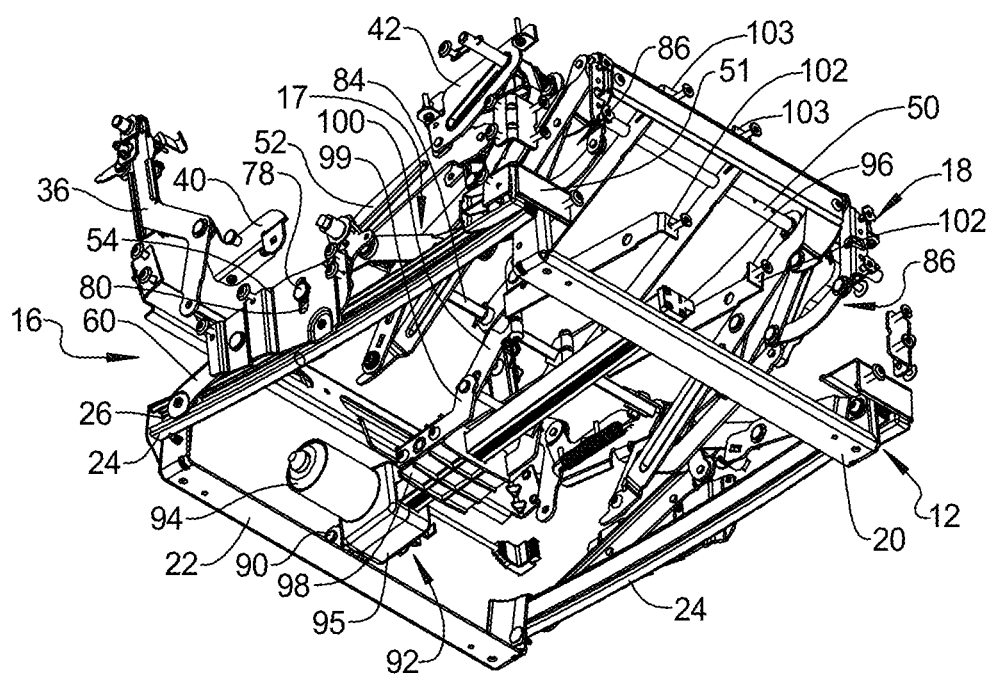
FIG. 4 is another perspective view of the furniture member showing legrest retracted, frame assembly un-titled and seatback upright with portions of the frame assembly removed for clarity.
Figure 5:
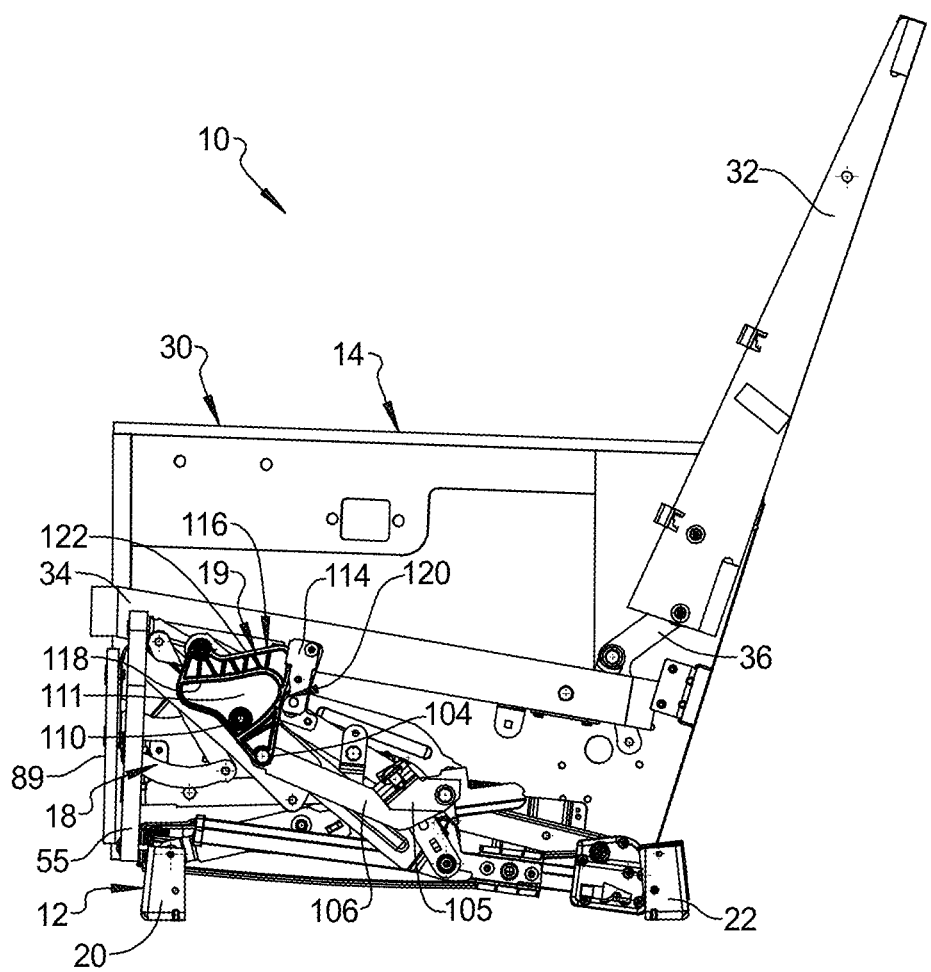
FIG. 5 is another side view of the furniture member showing legrest retracted, frame assembly un-tilted and seatback upright with portions of the frame assembly removed for clarity.
Figure 9:
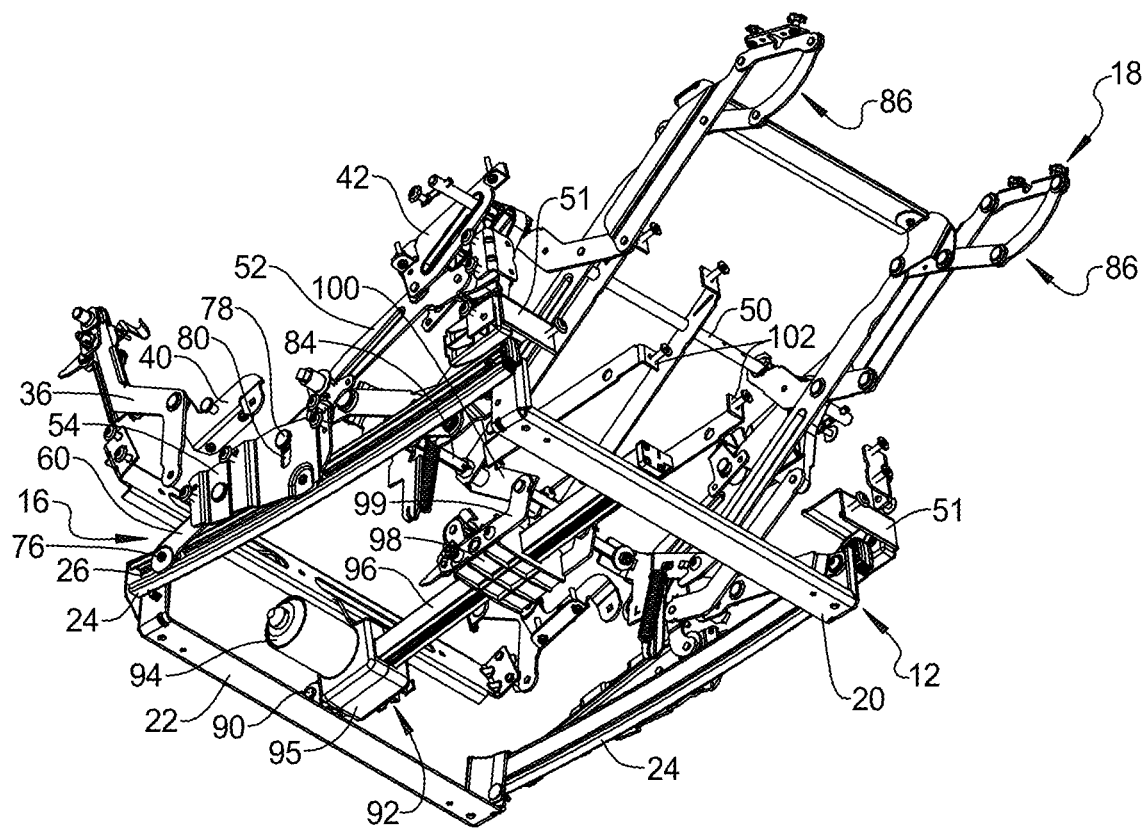
FIG. 9 is another perspective view of the furniture member showing legrest substantially extended, frame assembly partially tilted, and seatback pre-reclined with portions of the frame assembly removed for clarity.

As shown in FIGS. 4 and 9, a hinge pin assembly 90 connected to the rear support member 22 rotatably supports an electrically powered and occupant controlled drive mechanism 92. The drive mechanism 92 includes a motor 94, a drive assembly 95, an extrusion 96 and a sliding carriage 98. The motor 94 may be an AC or DC electric motor and may be operatively connected to the drive assembly 95. The extrusion 96 may be at least partially housed in the drive assembly 95 and may extend forward from the drive assembly 95.

The sliding carriage 98 is slidably disposed and supported on the extrusion 96 and is configured to slide in either a forward direction (i.e., toward the front of the furniture member 10) or a rearward or backward direction (i.e., toward the rear of the furniture member 10). The sliding carriage 98 is connected using a first pair of links 99 and a second pair of links 100 to the drive rod 84. The links 99 may be fixed to the sliding carriage 98. The links 100 may be pivotably coupled to the links 99 at a first end and may be drivingly engaged with the drive rod 84 at a second end.

A first pair of bracing links 102 and a second pair of bracing links 103 are coupled to the drive rod 84 and to the front board 55 and may further support the drive rod 84. The first pair of bracing links 102 and the second pair of bracing links 103 cooperate to form a V-shape.

Figure 11:
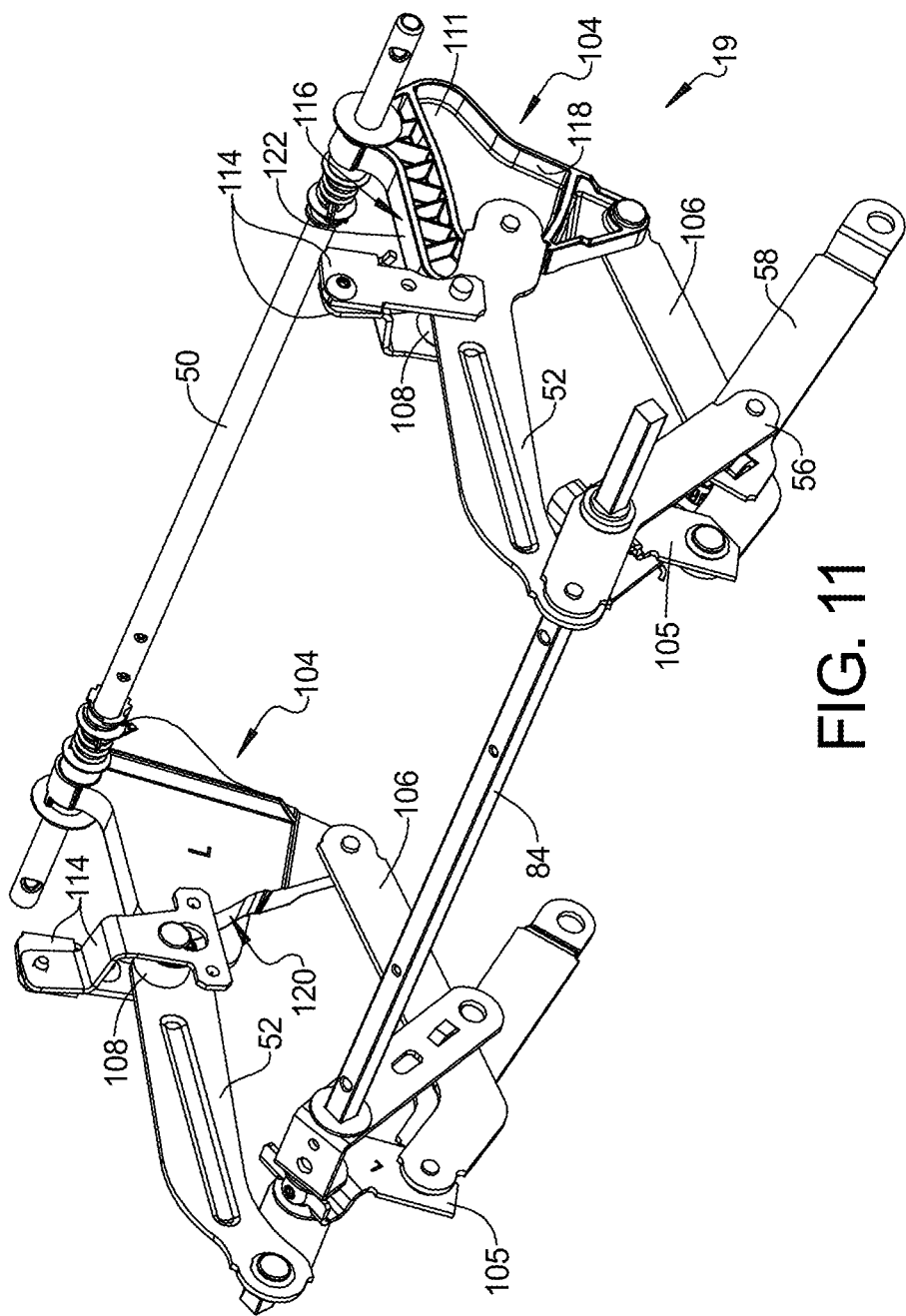
FIG. 11 is a perspective view of a sync mechanism of the furniture member when legrest is partially extended, frame assembly is partially tilted and seatback is pre-reclined.
Figure 12:
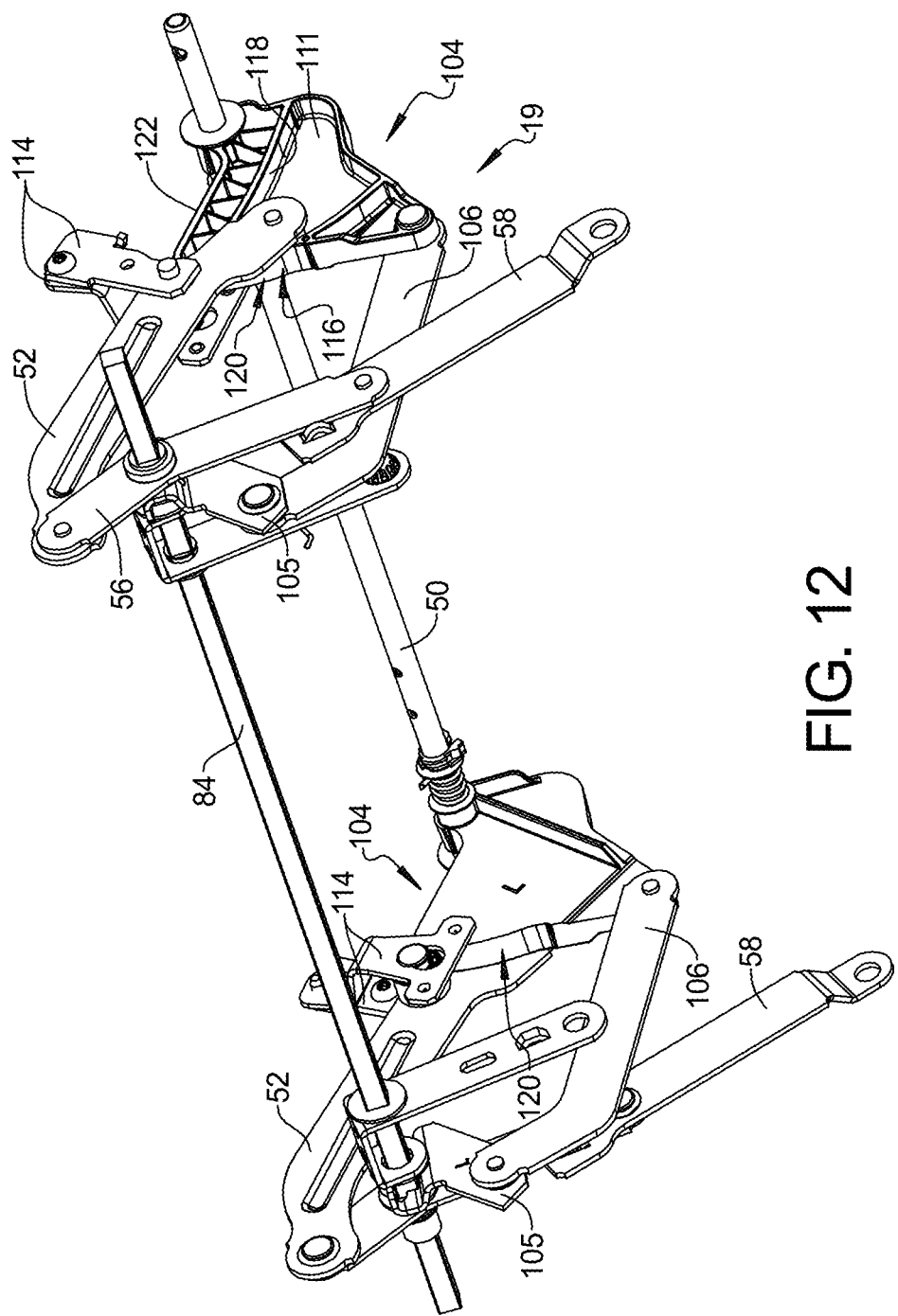
FIG. 12 is another perspective view of a sync mechanism of the furniture member when legrest is partially extended, frame assembly is partially tilted and seatback is pre-reclined.
Figure 13:
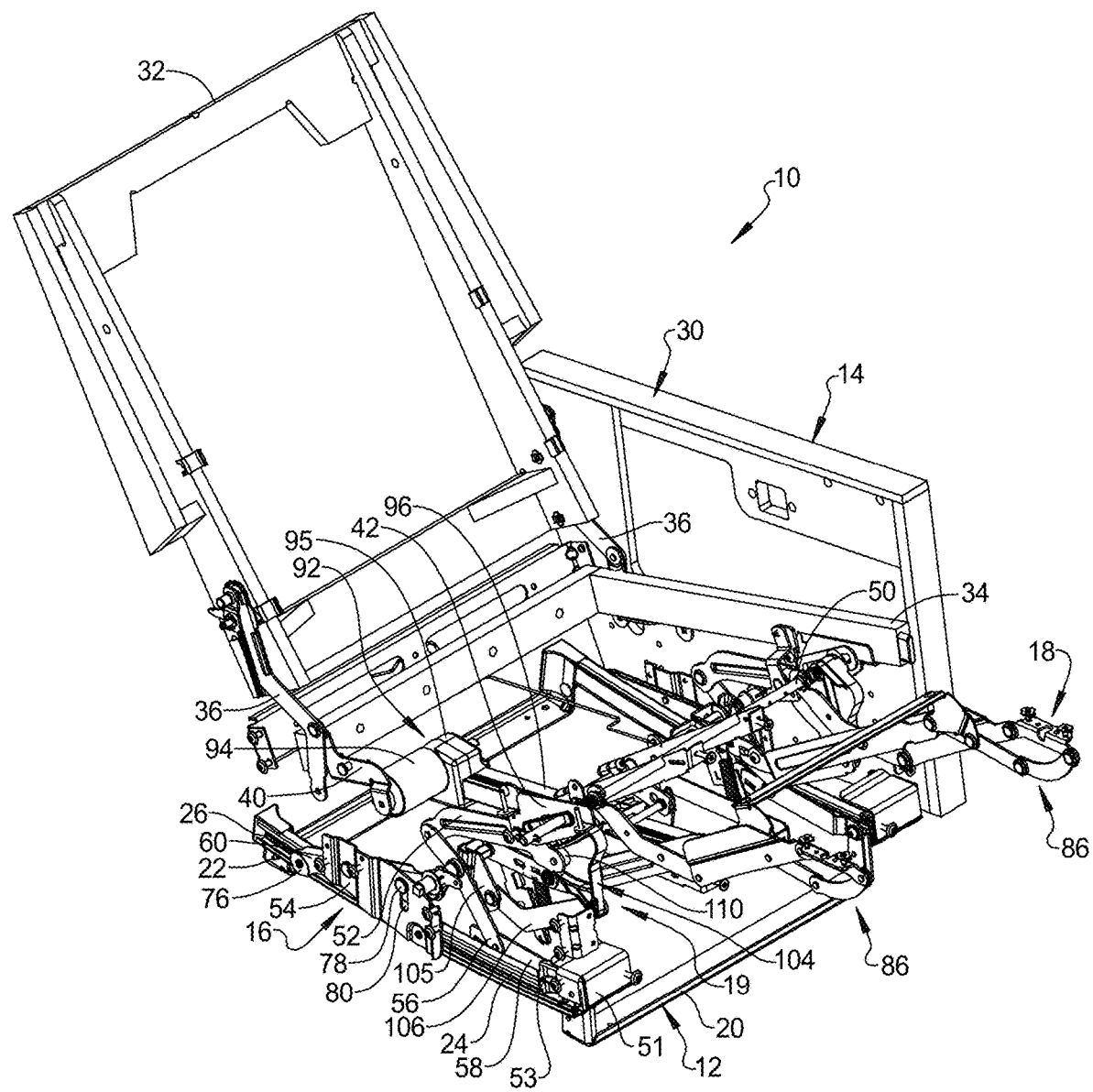
FIG. 13 is a perspective view of the furniture member showing legrest fully extended, frame assembly partially tilted and seatback partially reclined with portions of the frame assembly removed for clarity.
Figure 14:
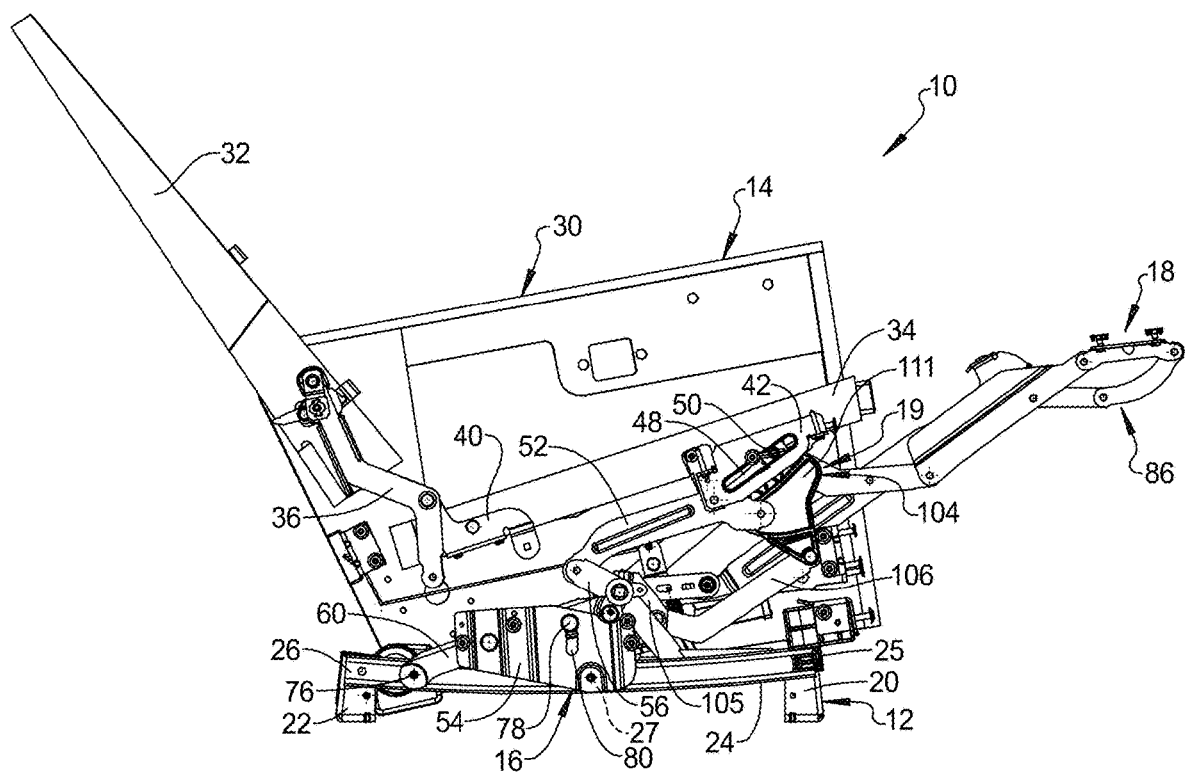
FIG. 14 is side view of the furniture member showing legrest fully extended, frame assembly partially tilted and seatback partially reclined with portions of the frame assembly removed for clarity.
Figure 15:
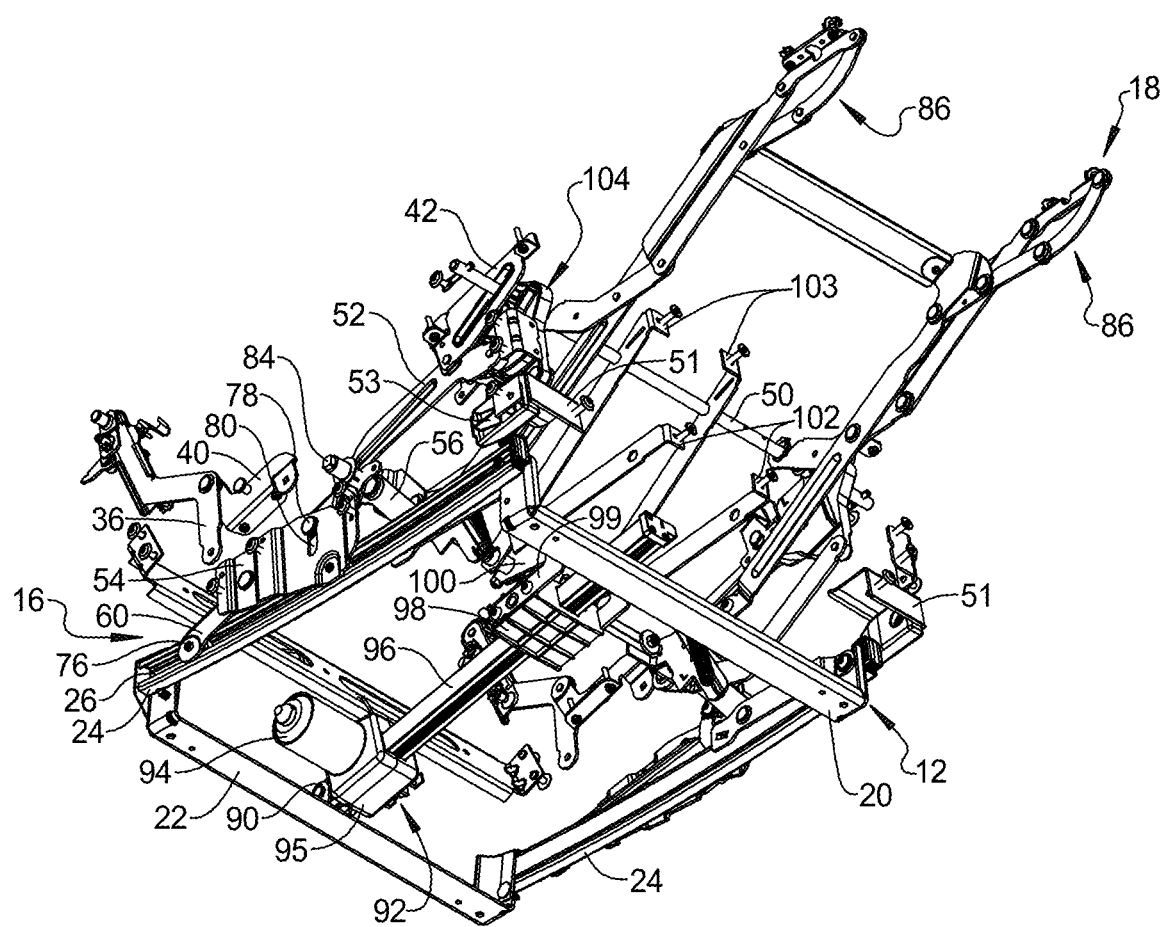
FIG. 15 is another perspective view of the furniture member showing legrest fully extended, frame assembly partially tilted and seatback partially reclined with portions of the frame assembly removed for clarity.

As shown in FIGS. 11 and 12, the sync mechanism 19 may be coupled to the support rod 50, the seat push link mechanism 17 and the drive rod 84 and may facilitate sequencing of the furniture member 10 during operation. That is, the sync mechanism 19 may prevent the frame assembly 14 from moving forward with respect to the base assembly 12 (which results in the recline of the seatback frame 32) until the legrest mechanism 18 has moved to the fully extended position. Stated differently, the sync mechanism 19 allows the drive rod 84 to rotate to move the legrest mechanism 18 toward the fully extended position while preventing the frame assembly 14 and the seat push link mechanism 17 from moving to the fully reclined position. In this way, the furniture member 10 may be operated using a single drive mechanism 92 (i.e., a single motor 94).

Figure 10:
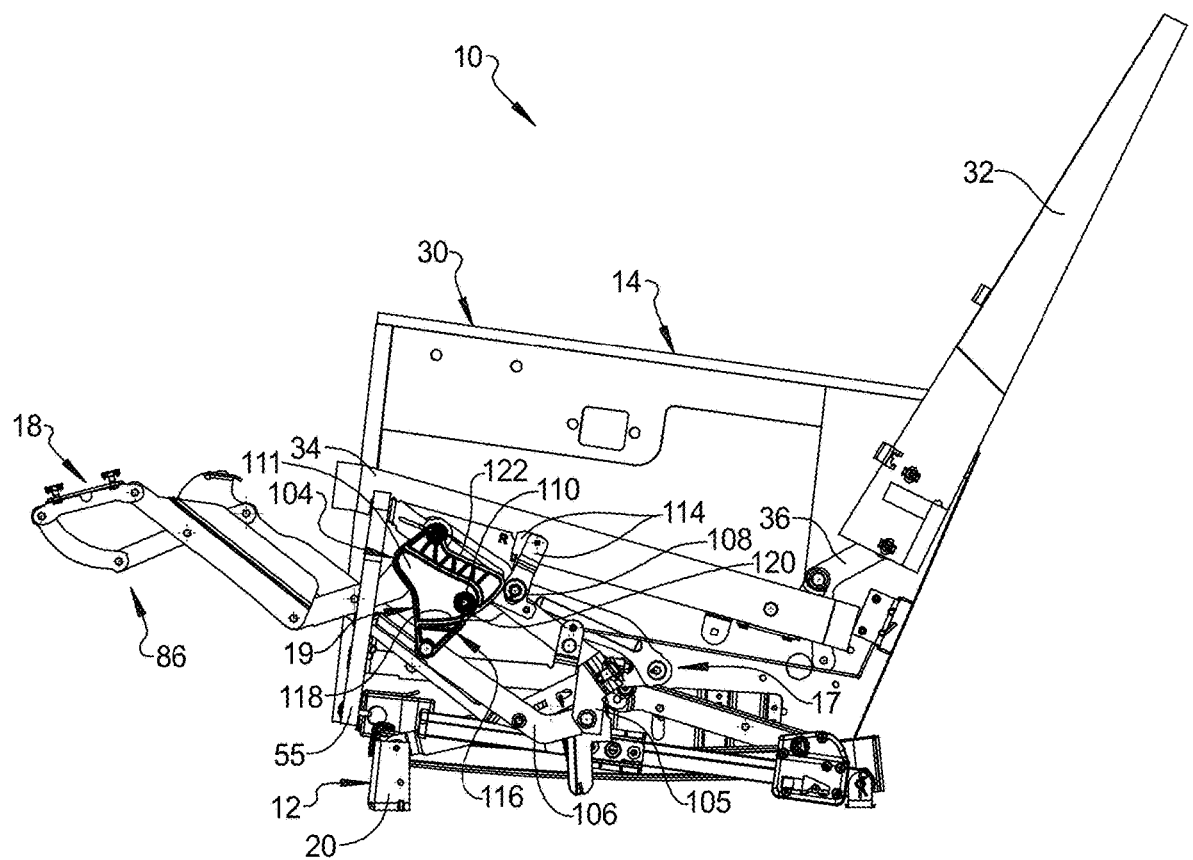
FIG. 10 is another side view of the furniture member showing legrest substantially extended, frame assembly partially tilted, and seatback pre-reclined with portions of the frame assembly removed for clarity.
Figure 16:
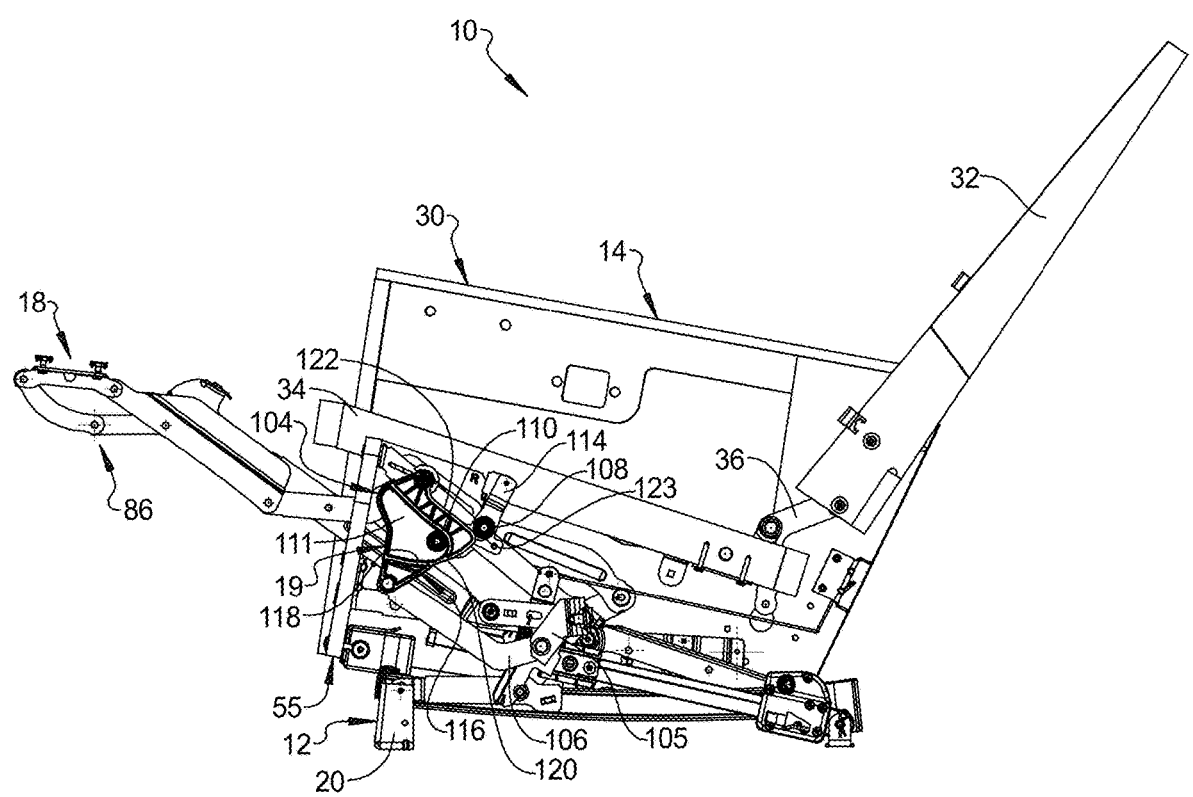
FIG. 16 is another side view of the furniture member showing legrest fully extended, frame assembly partially tilted and seatback partially reclined with portions of the frame assembly removed for clarity.
Figure 17:
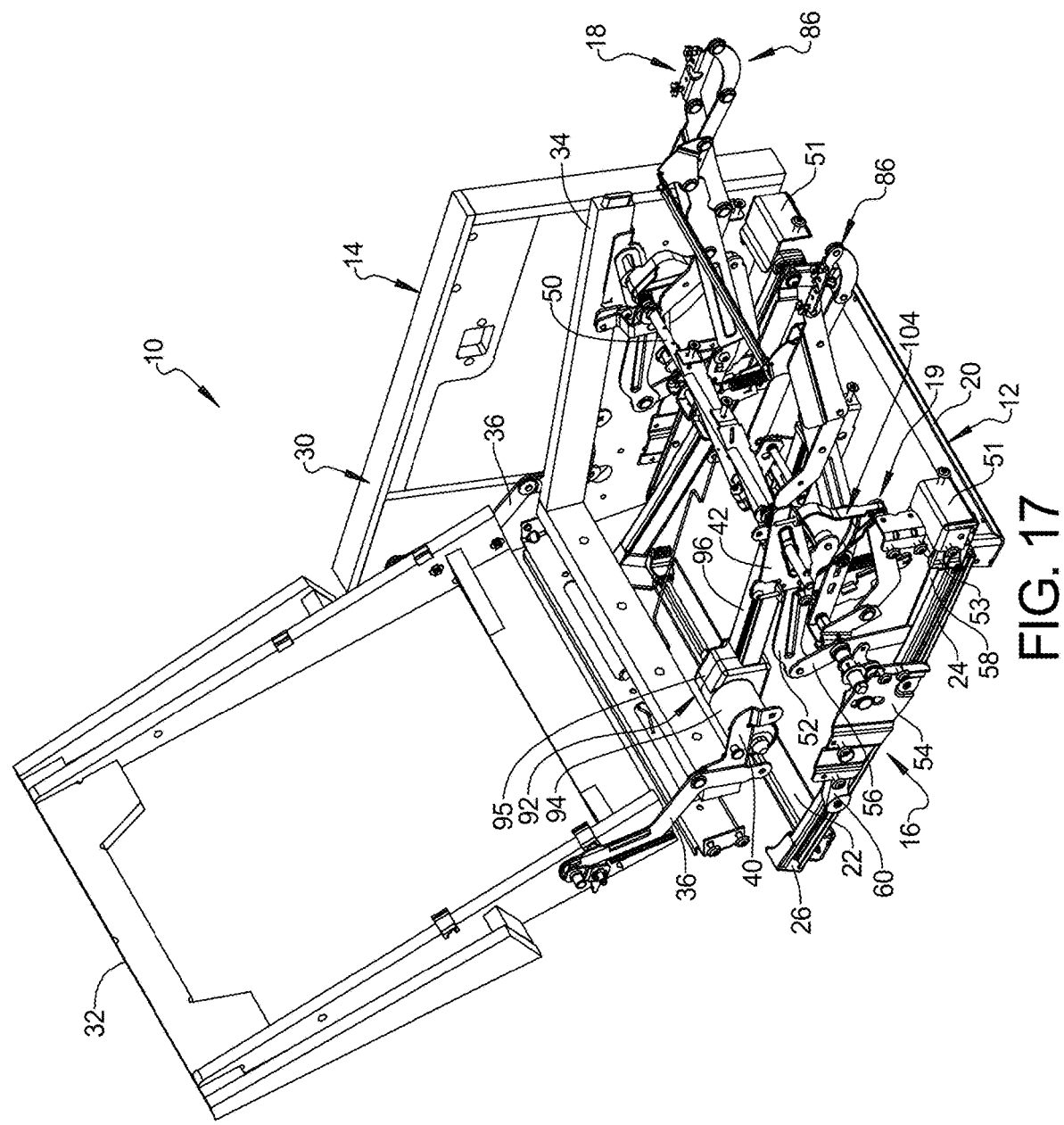
FIG. 17 is a perspective view of the furniture member showing legrest fully extended, frame assembly partially tilted and seatback partially reclined with portions of the frame assembly removed for clarity.
Figure 18:
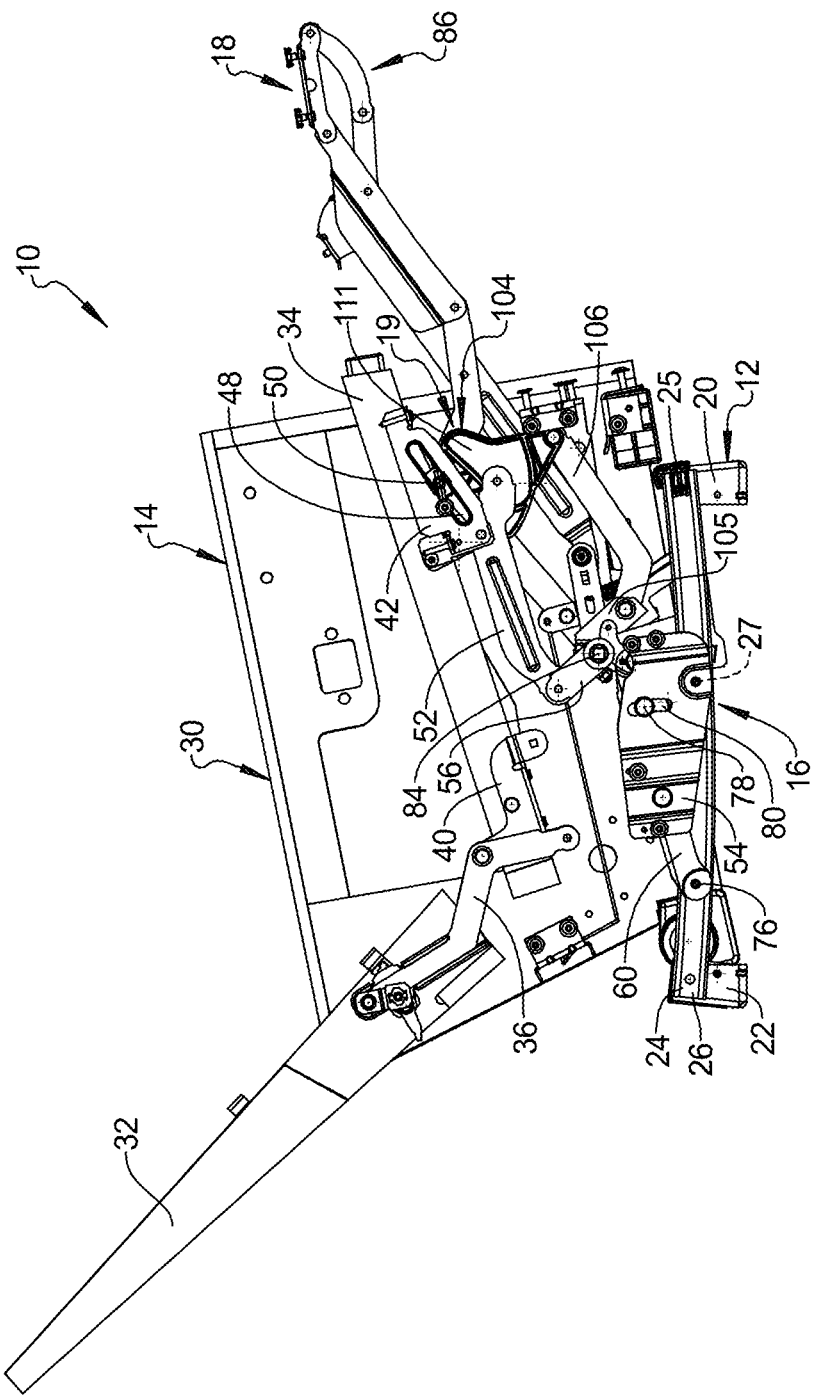
FIG. 18 is a side view of the furniture member showing legrest fully extended, frame assembly partially tilted and seatback partially reclined with portions of the frame assembly removed for clarity.
Figure 19:
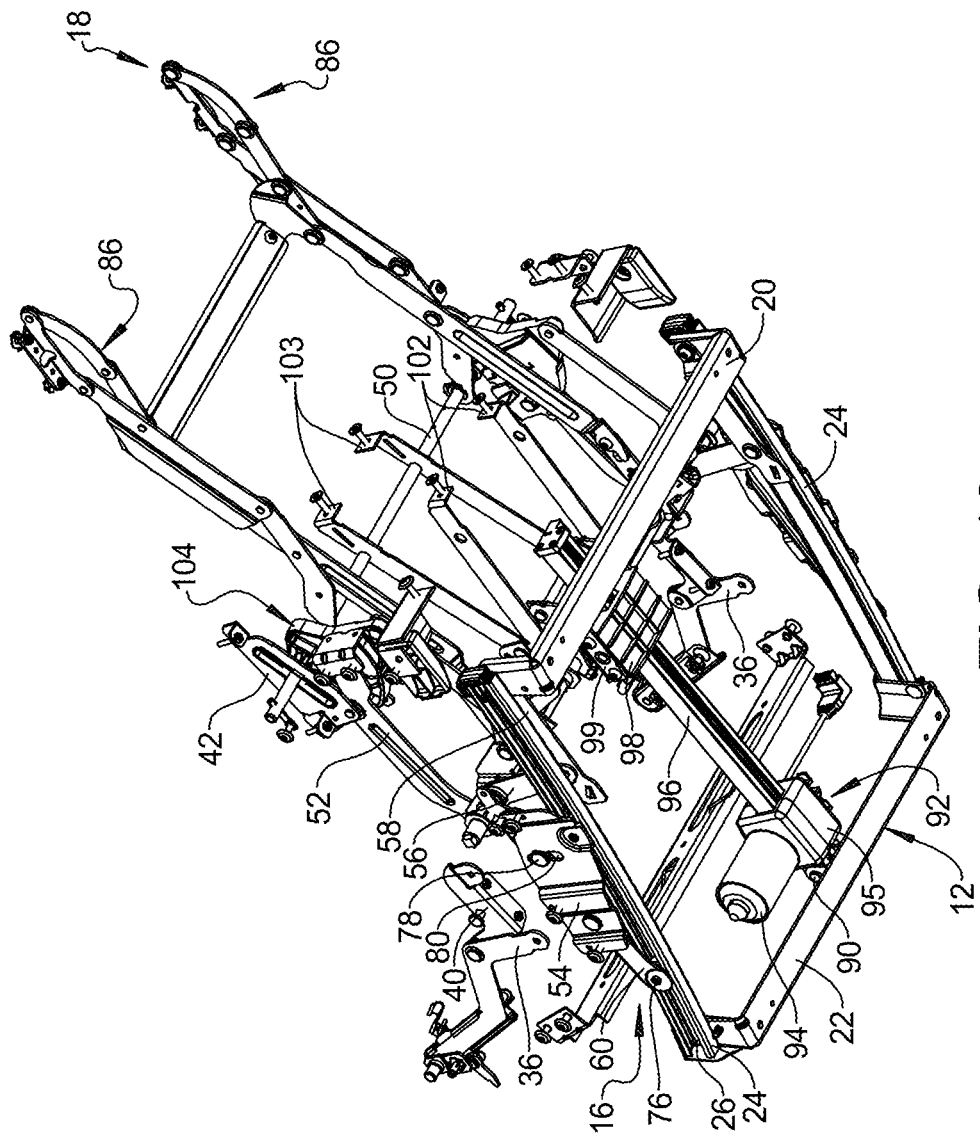
FIG. 19 is another perspective view of the furniture member showing legrest fully extended, frame assembly partially tilted and seatback partially reclined with portions of the frame assembly removed for clarity.
Figure 20:
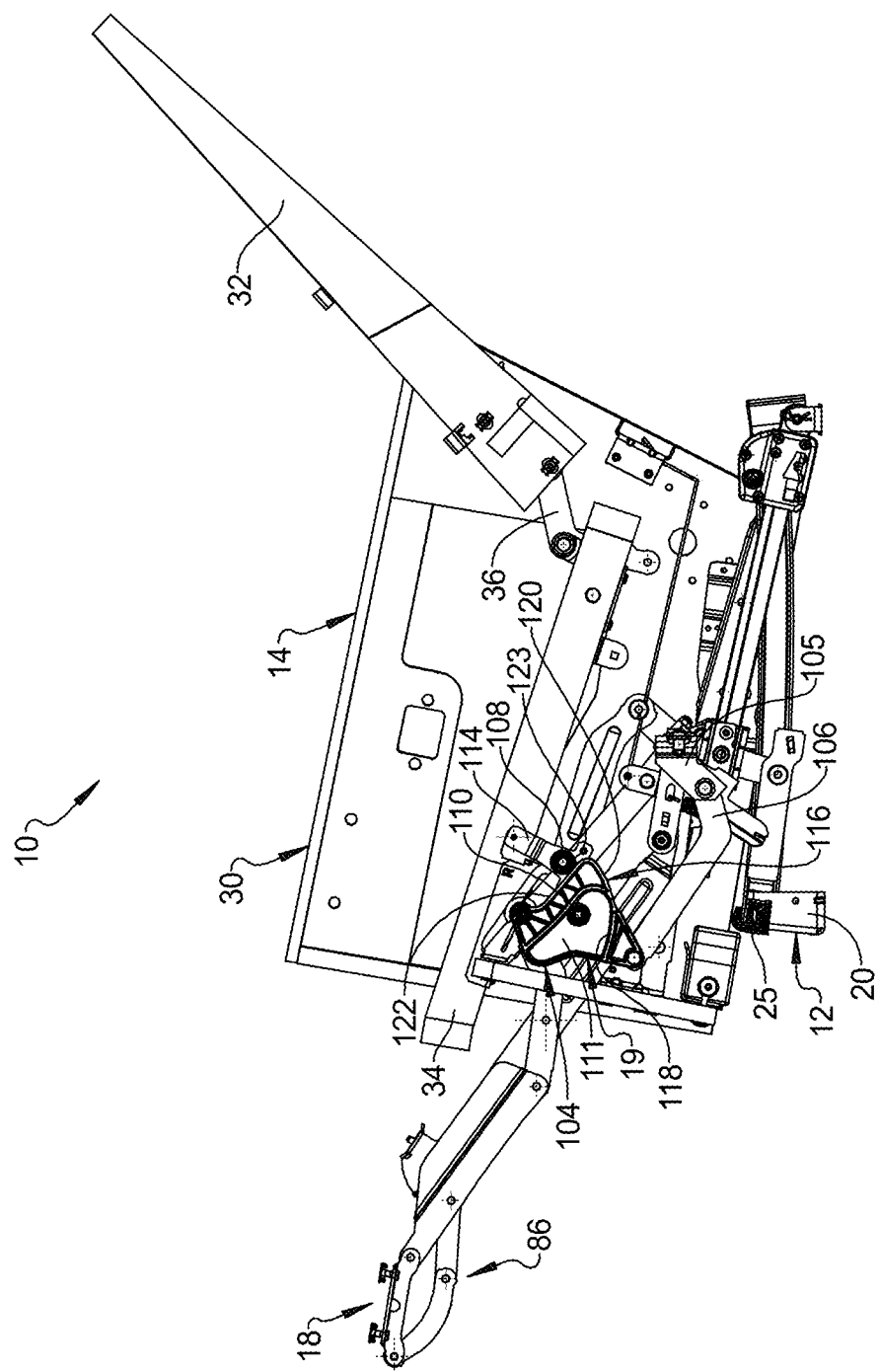
FIG. 20 is another side view of the furniture member showing legrest fully extended, frame assembly partially tilted and seatback partially reclined with portions of the frame assembly removed for clarity.
Figure 21:
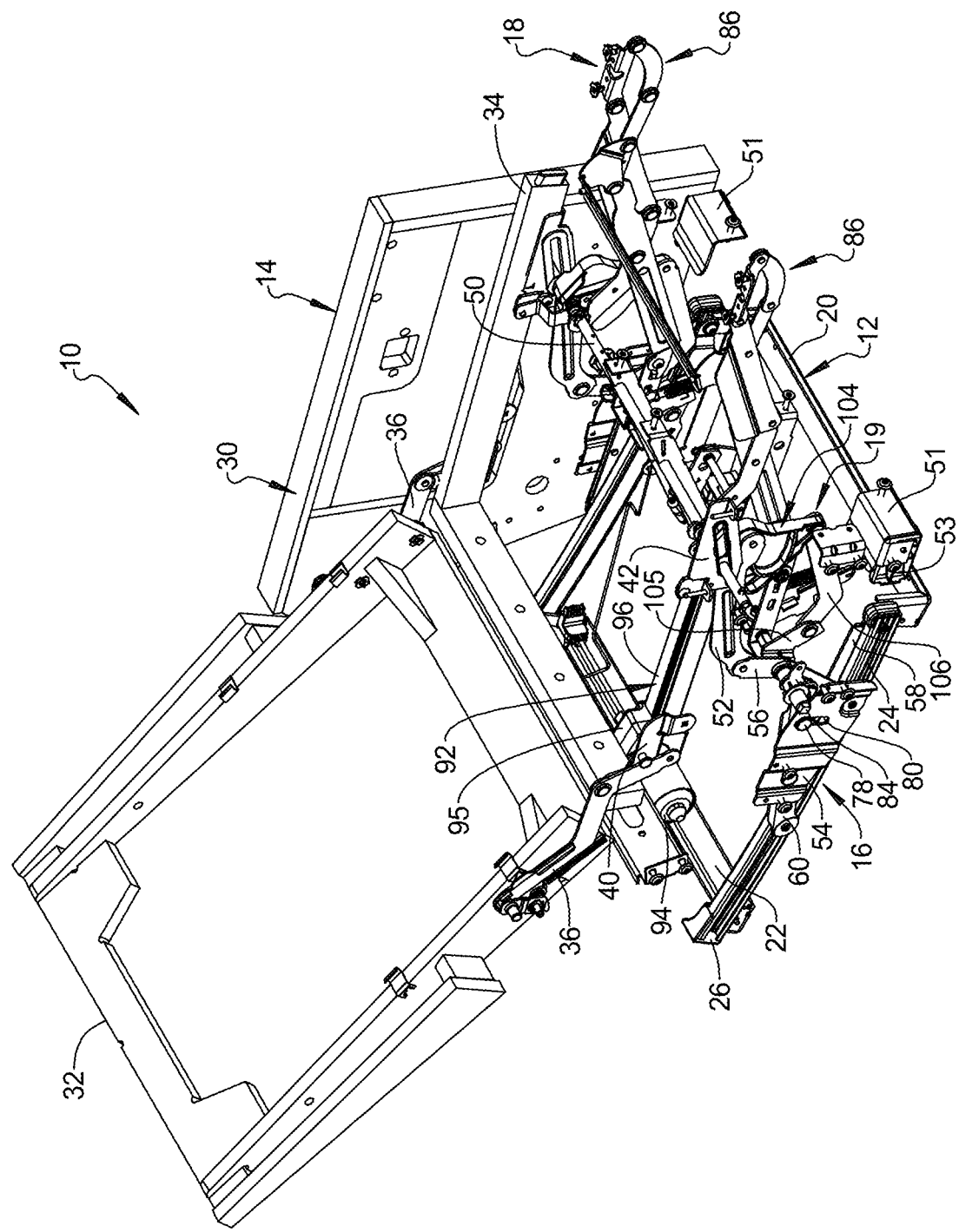
FIG. 21 is a perspective view of the furniture member showing legrest fully extended, frame assembly fully tilted and seatback fully reclined with portions of the frame assembly removed for clarity.
Figure 22:
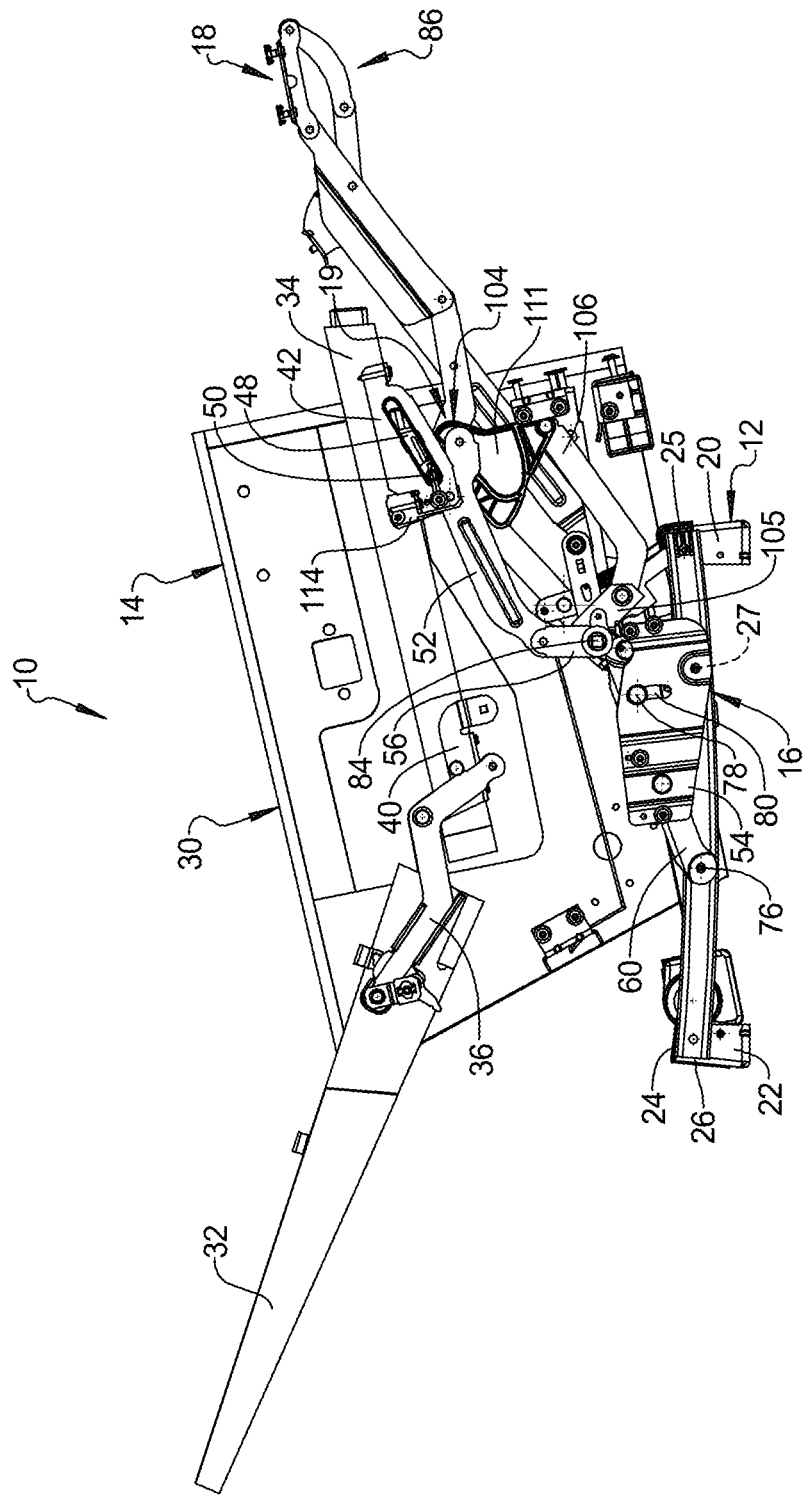
FIG. 22 is a side view of the furniture member showing legrest fully extended, frame assembly fully tilted and seatback fully reclined with portions of the frame assembly removed for clarity.
Figure 23:
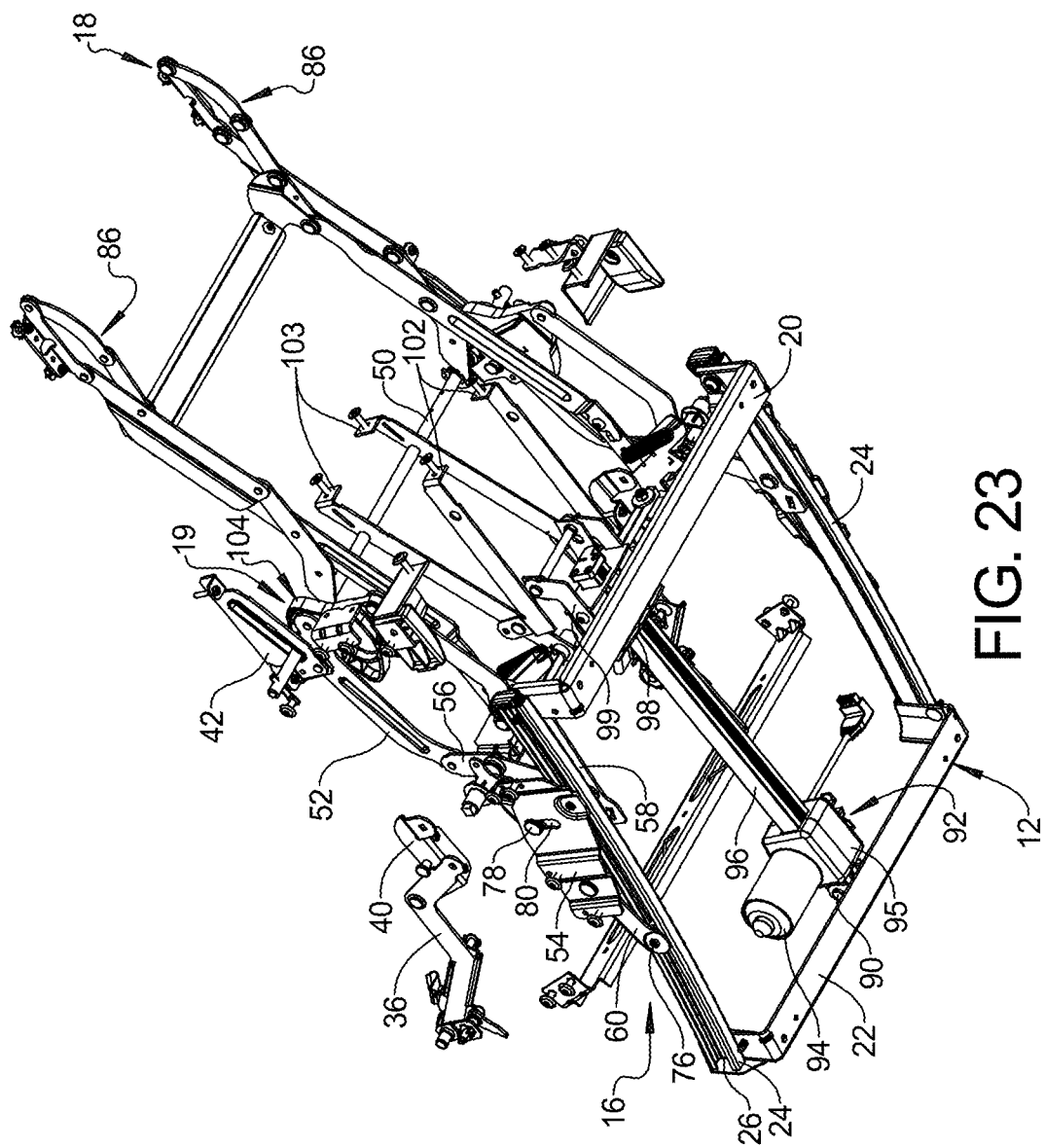
FIG. 23 is another perspective view of the furniture member showing legrest fully extended, frame assembly fully tilted and seatback fully reclined with portions of the frame assembly removed for clarity.
Figure 24:
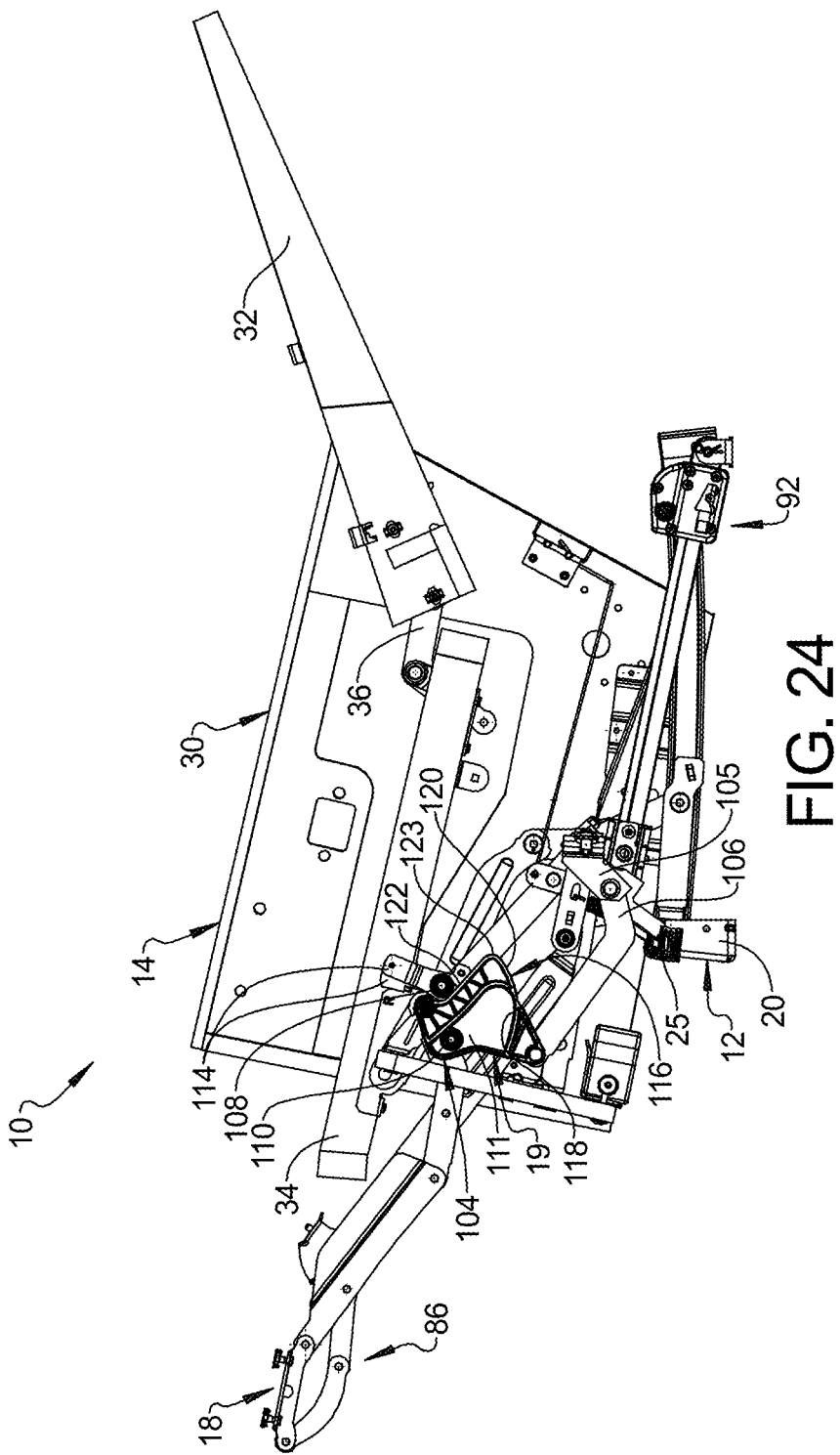
FIG. 24 is another side view of the furniture member showing legrest fully extended, frame assembly fully tilted and seatback fully reclined with portions of the frame assembly removed for clarity.

The sync mechanism 19 may include a pair of cams 104, a pair of sync drive-rod links 105, a pair of cam links 106, a pair of first rollers or front sync rollers 108 (FIGS. 10 and 16) and a pair of second rollers or rear sync rollers 110 (FIGS. 10 and 16). The cams 104 may be made of a polymeric material such as polyoxymethylene or from a composite or a metal material. The cams 104 may be generally triangular-shaped and may include a pocket 111 formed therein. The cams 104 are pivotably coupled to and supported by opposing ends of the support rod 50. The sync drive-rod links 105 are drivingly engaged with the drive rod 84 and are pivotably coupled to the cam links 106. Each cam link 106 is pivotably coupled to an edge of each cam 104. In this way, rotation of the drive rod 84 causes corresponding rotation of the cams 104.

Each first roller 108 is rotatably coupled to and supported by a pair of reinforcing brackets 114, which are, in turn, fixedly coupled to a respective front arm 42 (FIG. 2). When the legrest mechanism 18 is fully extended and the frame assembly 14 is between the partially reclined position and the fully reclined position, the reinforcing brackets 114 provide support to the first pair of rollers 108 to prevent the legrest mechanism 18 from rotating the cams 104 in a rearward direction (via the sync drive-rod links 105, the cam links 106 and the drive rod 84) when a user pushes down on the legrest mechanism 18 (using his or her legs or feet). Each first roller 108 is also rotatably coupled to a respective connecting link 52 and is configured to roll along an outer surface profile 116 of a respective cam 104.

Each second roller 110 is associated with a respective cam 104 and is also rotatably coupled to and supported by a respective connecting link 52. That is, the second roller 110 is disposed within a pocket 111 of the respective cam 104 and is configured to roll along an inner surface profile 118 of the pocket 111. The first rollers 108 and the second rollers 110 are spaced apart from each other. The second rollers 110 keep the first pair of rollers 108 substantially in contact with the cams 104 as the first pair of rollers 108 roll along the pair of cams 104. The shape of the cam 104 and the first and second rollers 108, 110 control the transition from the legrest mechanism 18 being fully extended to the seatback frame 32 being fully reclined. The shape of the cam 104 and the first and second rollers 108, 110 also ensure that the transition is smooth.

With continued reference to FIGS. 1-26, operation of the furniture member 10 will be described in detail. As described above, the frame assembly 14 is movable relative to the base assembly 12 among an upright position (FIGS. 1-5), a pre-reclined position (FIGS. 7-10), a partially reclined position (FIGS. 13-16) and a fully reclined position (FIGS. 21-24). The legrest mechanism 18 is movable relative to the frame assembly 14 between a retracted position (FIGS. 1-5) and a fully extended position (FIGS. 13-24).

When the furniture member 10 is in the upright position, the body frame 30, the seatback frame 32 and the seat bottom frame 34 are oriented in a first position relative to the support surface. As shown in FIG. 10, when the furniture member 10 is driven by movement of the tilt mechanism 16 to the pre-reclined position, the body frame 30, the seatback frame 32 and the seat bottom frame 34 are oriented in a second position relative to the support surface, however, the orientation of the body frame 30, the seatback frame 32 and the seat bottom frame 34 relative to each other may be the same in the upright position and the pre-reclined position. The frame assembly 14 is tilted when the furniture member 10 is moved from the upright position to the pre-reclined position such that in the pre-reclined position, an aft end of the frame assembly is vertically closer to the support surface than it is in the upright position, and a front end of the frame assembly 14 is vertically farther apart from the support surface than it is in the upright position. Moving the furniture member 10 to the fully reclined position causes further tilting of the frame assembly 14 relative to the support surface and simultaneously causes relative movement between the body frame 30, seatback frame 32 and seat bottom frame 34. In the fully reclined position, an aft end of the body frame 30 is vertically closer to the support surface than it is in in the upright position and pre-reclined position, and a front end of the body frame 30 is vertically farther apart from the support surface than it is in the upright and pre-reclined positions. Furthermore, the frame assembly 14 is translated forward (toward the front end of the rails 24) as the furniture member 10 is moved into the fully reclined position so that the furniture member 10 can maintain a desired amount of clearance from a wall (not shown) in a room in which the furniture member 10 is situated in the upright position and fully reclined position without moving the base assembly 12 relative to the wall.

To move the legrest mechanism 18 from the retracted position to the fully extended position, the user may operate the motor 94 (via an electrical switch (not shown)), which causes the sliding carriage 98 to slide forwardly along the extrusion 96 and in turn causes corresponding rotation of the second pair of links 100. This, in turn, causes rotation of the drive rod 84, which causes the pantograph linkages 86 to move into the fully extended position. Rotation of the second pair of links 100 and the drive rod 84, as described above, also causes the pair of sync drive-rod links 105 and the cam links 106 to rotate, which, in turn, causes the cams 104 to rotate about the support rod 50. As shown in FIG. 10, when the cams 104 rotate, the first pair of rollers 108 are in contact with and rotate along side surfaces 120 of the outer surface profiles 116, and the second pair of rollers 110 rotate along the inner surface profiles 118 of the cams 104. The cams 104 prevent the frame assembly 14 from moving toward the reclined position until the pantograph linkages 86 move to the fully extended position. That is, the first pair of rollers 108 contacting the side surfaces 120 of the outer surface profiles 116 of the cams 104 as the pantograph linkages 86 move to the fully extended position prevent the seat bottom frame 34 and the sliders 42 from moving forward relative to the body frame 30. As shown in FIG. 16, once the pantograph linkages 86 are in the fully extended position, the first pair of rollers 108 are in contact with upper surfaces 122 of the outer surface profiles 116 (the side surfaces 120 and the upper surfaces 122 are disposed at an angle A relative to each other; the angle A may be between 20 degrees and 85 degrees). Stated differently, when the legrest mechanism 18 is moved from the retracted position to the fully extended position, the cams 104 rotate such that the first pair of rollers 108 contact and rotate along the side surfaces 120 of the outer surface profiles 116, then radii 123 of the outer surface profiles 116 and finally are positioned on the upper surfaces 122 of the outer surface profiles 116.

Furthermore, such rotation of the second pair of links 100 and the drive rod 84, as described above, also simultaneously causes the furniture member 10 to move from the upright position to the pre-reclined position (compare FIGS. 3 and 10). That is, rotation of the second pair of links 100 and the drive rod 84, as described above, causes rotation of the tilt drive links 83, which in turn, pivots the tilt rear drive links 60 relative to the side plates 54 such that the rivets 78 connected to the tilt rear drive links 60 slide upwardly in the slots 80 in the side plates 54 and the relative position of rear bearing 76 moves with respect to the side plates 54 and body frame 30. This relative motion tilts body frame 30, seat bottom frame 34, and seatback frame 32 with respect to base assembly 12.

When the legrest mechanism 18 is in the fully extended position, the frame assembly 14 is in the partially reclined position. That is, drive rod 84 has rotated the sync drive-rod link 105 to position the cam 104 so that the sync roller 108 is positioned on surface 122 of cam 104. When sync roller 108 is on surface 122, movement between the seat bottom frame 34 and the body frame 30 is allowed (compare FIGS. 10 and 16). Further operation of the motor 94 (via actuation of the actuator) causes the sliding carriage 98 to slide further forward along the extrusion 96, which moves the frame assembly 14 from the partially reclined position to the fully reclined position. That is, when the sliding carriage 98 slides further forward along the extrusion 96 due to further operation of the motor 94, the seat bottom frame 34 and the sliders 42 are allowed to slide forward while the seat push link mechanism 17 causes body frame 30 to move forward with respect to base assembly 12, thereby causing bearings 27, 76 of the tilt mechanism 16 slide forward in the curved track channel 26. Such movement of the seat bottom frame 34 and the sliders 42 cause rotation of the seatback frame 32 relative to the seat bottom frame 34 and such movement of the tilt mechanism 16 causes the frame assembly 14 to be simultaneously translated forward relative to the base assembly 12 and tilted rearward relative to the base assembly 12. It should be understood that the drive rod 84 and the pair of cams 104 do not rotate when the frame assembly 14 moves from the partially reclined position toward the fully reclined position. It should be also understood that when the seat bottom frame 34 and the sliders 42 move forward, the first pair of rollers 108 roll along the upper surfaces 122 of the cams 104 (FIGS. 20 and 24), which also translates the pair of connecting links 52 and rotates the pair of upper front drive links 56 about drive rod 84 resulting in translation of the pair of lower front drive links 58.

The cams 104 ensure proper sequencing of the frame assembly 14, the tilt mechanism 16 and the legrest mechanism 18 when moving back to the initial states (i.e., the cams 104 ensure that the frame assembly 14 and the tilt mechanism 16 are moved from the fully reclined position to at least the partially reclined position before the legrest mechanism 18 starts to move from the fully extended position to the retracted position).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A furniture member comprising:
    a base assembly;
    a frame assembly supported by the base assembly and including a seat bottom frame and a seatback frame, wherein the seatback frame is movable relative to the base assembly and the seat bottom frame among an upright position, a partially reclined position and a fully reclined position;
    a legrest mechanism including a legrest platform and a pair of linkages that are configured to move the legrest platform relative to the frame assembly between a retracted position and a fully extended position; and
    a sync mechanism attached to the frame assembly and the legrest mechanism and including a cam, a sync drive-rod link, a cam link, a first roller, and a second roller, wherein:
        the cam is rotatable relative to the frame assembly and includes an outer surface profile and an inner surface profile,
        the sync drive-rod link is pivotably coupled to the cam link,
        the cam link is pivotably coupled to the cam,
        the first roller is configured to roll along the outer surface of the cam, and
        the second roller is configured to roll along the inner surface profile of the cam.

2. The furniture member of claim 1, wherein the sync mechanism is configured to restrict movement of the frame assembly from the upright position toward the partially reclined position until the legrest platform reaches the fully extended position.

3. The furniture member of claim 1, further comprising an actuator configured to power movement of the legrest mechanism between the retracted position and the fully extended position, wherein the actuator is configured to power movement of the frame assembly among the upright position, the partially reclined position and the fully reclined position.

4. The furniture member of claim 1, wherein the frame assembly moves forward relative to the base assembly when the frame assembly moves from the partially reclined position toward the fully reclined position.

5. The furniture member of claim 1, wherein the seat bottom frame is moveable relative to the base assembly.

6. The furniture member of claim 1, further comprising:
    a drive rod rotatably supported by the frame assembly, and
    an actuator configured to the drive rod to power movement of the legrest mechanism between the retracted position and the fully extended position, and movement of the seatback frame among the upright position, the partially reclined position and the fully reclined position.

7. The furniture member of claim 6, wherein the drive rod rotates to move the legrest mechanism from the retracted position to the fully extended position and to move the seatback frame from the upright position to the partially reclined position, and wherein the drive rod translates to move the seatback assembly from the partially reclined position to the fully reclined position.

8. The furniture member of claim 6, further comprising first and second braces coupled to the frame assembly and the drive rod to further support the drive rod, and wherein the first and second braces cooperate to form a V-shape.

9. The furniture member of claim 1, further comprising a seat push link mechanism moving the frame assembly from the partially reclined position to the fully reclined position.

10. A furniture member comprising:
  a base assembly;
  a frame assembly supported by the base assembly and including a body frame, a seatback frame and a seat bottom frame, the seat bottom frame being movably coupled to the seatback frame such that movement of the seat bottom frame relative to the body frame causes corresponding rotation of the seatback frame; and
  a cam that is rotatable relative to the frame assembly, wherein the cam is rotatable between a first position in which the cam prevents the seat bottom frame from moving relative to the body frame and a second position in which the cam allows the seat bottom frame to move relative to the body frame.

11. The furniture member of claim 10, wherein the cam includes an outer surface profile having a first surface and a second surface, and wherein the first surface and the second surface are angled relative to each other.

12. The furniture member of claim 10, further comprising a first roller configured to rotate along an outer surface profile of the cam as the cam rotates between the first and second positions.

13. The furniture member of claim 12, wherein the outer surface profile includes a first surface and a second surface, and wherein the first roller is in contact with the first surface when the cam is in the first position and the first roller is in contact with the second surface when the cam is in the second position.

14. The furniture member of claim 12, further comprising a reinforcing bracket fixed to the seat bottom frame, and wherein the first roller is rotatably coupled to the reinforcing bracket.

15. The furniture member of claim 12, further comprising a second roller, wherein the cam includes a pocket having an inner surface profile, and wherein the second roller is configured to rotate along the inner surface profile as the cam rotates between the first and second positions.

16. The furniture member of claim 10, further comprising:
  a drive rod rotatably supported by the frame assembly; a cam link; and
  a sync drive-rod drivingly engaged with the drive rod and rotatably coupled to the cam link
  wherein the cam link is rotatably coupled to the cam, and wherein rotating the drive rod causes the cam to rotate between the first position and the second position.

17. The furniture member of claim 16, further comprising first and second braces coupled to the frame assembly and the drive rod to further support the drive rod, and wherein the first and second braces cooperate to form a V-shape.

18. The furniture member of claim 10, further comprising:
  a drive rod rotatably supported by the frame assembly and rotatable about a first rotational axis; and
  a seat push link mechanism including:
    a lower front drive link rotatably coupled to the base assembly and rotatable about a second rotational axis;
    an upper front drive link rotatably coupled to the lower front drive link and rotatable about a third rotational axis; and
    a connecting link rotatably coupled to the upper front drive link.

19. The furniture member of claim 18, further comprising a first roller rotatably coupled to the connecting link and a second roller rotatably coupled to the connecting link, and wherein the first roller is configured to rotate along a first surface profile of the cam and the second roller is configured to rotate along a second surface profile of the cam.

20. The furniture member of claim 19, wherein when the cam is in the first position, a straight line extends through the first rotational axis and the second rotational axis, and wherein a stopping lance extending from the lower front drive link engages the upper front drive link to prevent the third rotational axis from aligning with or being positioned above the straight line.

* * * * *